US011018992B2

(12) United States Patent
Momchilov et al.

(10) Patent No.: US 11,018,992 B2
(45) Date of Patent: *May 25, 2021

(54) SYSTEMS AND METHODS FOR GENERATING VIRTUAL SESSION CONNECTION LEASES USING TEMPLATES

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,846

(22) Filed: May 24, 2019

(65) Prior Publication Data
US 2020/0374239 A1 Nov. 26, 2020

Related U.S. Application Data

(63) Continuation of application No. 16/416,481, filed on May 20, 2019.

(51) Int. Cl.
*H04L 12/911* (2013.01)
*G06F 9/451* (2018.01)
(Continued)

(52) U.S. Cl.
CPC ........... *H04L 47/826* (2013.01); *G06F 9/452* (2018.02); *G06F 9/45558* (2013.01);
(Continued)

(58) Field of Classification Search
CPC ........... H04L 61/2592; H04L 63/0272; H04L 63/0281; H04L 63/029; H04L 63/0807;
(Continued)

(56) References Cited

U.S. PATENT DOCUMENTS 7,724,657 B2   5/2010   Rao et al.
8,990,898 B2   3/2015   Bell
(Continued)

FOREIGN PATENT DOCUMENTS

WO   WO 01/86423      1/2003
WO   WO 2013/122977   8/2013

*Primary Examiner* — Djenane M Bayard
(74) *Attorney, Agent, or Firm* — Allen, Dyer, Doppelt + Gilchrist, PA

(57) ABSTRACT

A computing device may include a memory and a processor cooperating with the memory and configured to access a plurality of connection lease templates corresponding to published resources stored in a shared memory. The processor may further be configured to provision connection leases for respective client devices using a connection lease issuing appliance based upon the stored connection lease templates. The connection leases may be provisioned on demand responsive to selection of the published resources by the client devices, and the connection leases may provide instructions for connecting the client devices to virtual computing sessions corresponding to the published resources.

17 Claims, 13 Drawing Sheets

(51) Int. Cl.
*G06F 9/455* (2018.01)
*H04L 29/08* (2006.01)
*H04L 29/06* (2006.01)

(52) U.S. Cl.
CPC ........ *H04L 67/1097* (2013.01); *H04L 67/141* (2013.01); *H04L 67/142* (2013.01); *H04L 67/146* (2013.01); *H04L 67/26* (2013.01); *H04L 67/42* (2013.01); *G06F 2009/45595* (2013.01)

(58) Field of Classification Search
CPC ............. H04L 63/0815; H04L 63/0823; H04L 63/0861; H04L 63/104; H04L 65/1016; H04L 65/403; H04L 65/608; H04L 67/145; H04L 67/26; H04L 67/306; H04L 69/16; H04L 69/22; H04L 69/324; H04L 9/0816; H04L 9/3234; H04L 9/3263; H04L 12/14; H04L 12/1403; H04L 12/1818; H04L 2209/38; H04L 2209/64; H04L 41/0226; H04L 41/046; H04L 41/0681; H04L 41/0893; H04L 41/0896; H04L 41/12; H04L 41/5003; H04L 41/5009; H04L 41/5019; H04L 41/5051; H04L 41/5054; H04L 47/826; H04L 67/141; H04L 67/1097; H04L 67/2842; H04L 67/42; H04L 2209/24; H04L 2209/60; H04L 2209/605; H04L 2209/76; H04L 2209/80; H04L 2463/101; H04L 27/2608; H04L 5/0007; H04L 5/0037; H04L 5/0046; H04L 5/006; H04L 5/0094; H04L 63/0428; H04L 63/08; H04L 63/123; G06F 9/45558; G06F 9/452; G06F 2009/45595; G06F 21/6209; G06F 21/6218; G06F 2221/2141; G06F 12/0813; G06F 12/0815; G06F 12/0866; G06F 16/172; G06F 16/182; G06F 16/183; G06F 21/10; G06F 2212/264; G06F 2212/463; G06F 16/93; G06F 16/951; G06F 21/60; G06F 21/602; G06F 40/166; G06F 40/30; G06F 8/63; G06F 3/0605; G06F 3/0608; G06F 3/0631; G06F 3/0644; G06F 3/0659; G06F 3/0686; G06F 40/186; G06F 16/334; G06F 16/9535; G06F 21/606; G06F 2221/2137; G06F 40/174; G06F 40/197; G06F 40/253; G06F 40/284; G06F 16/29; G06F 16/3344; G06F 16/5838; G06F 40/10; G06F 40/134; G06F 40/20; G06F 40/279; G06F 11/006; G06F 16/338; G06F 16/58; G06F 16/958; G06F 17/18; G06F 2221/2149; G06F 40/169; G06F 8/20; G06F 8/34

See application file for complete search history.

(56) References Cited

U.S. PATENT DOCUMENTS

| | | | |
|---|---|---|---|
| 9,009,327 | B2 | 4/2015 | Adhya et al. |
| 9,426,227 | B2 | 8/2016 | Bell |
| 10,019,128 | B2 | 7/2018 | Goodwin et al. |
| 2010/0306379 | A1* | 12/2010 | Ferris ................ H04L 41/5006 709/226 |
| 2011/0251992 | A1* | 10/2011 | Bethlehem ............ H04L 67/306 707/610 |
| 2013/0219468 | A1* | 8/2013 | Bell .................... H04L 63/0428 726/4 |
| 2016/0041837 | A1* | 2/2016 | Rangayya ........... H04L 41/0826 718/1 |

\* cited by examiner

SYSTEMS AND METHODS FOR GENERATING VIRTUAL SESSION CONNECTION LEASES USING TEMPLATES

RELATED APPLICATIONS

This application is a continuation of Ser. No. 16/416,481 filed May 20, 2019, which is hereby incorporated herein in its entirety by reference.

BACKGROUND

Many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment, or cloud system, in which a pool of computing resources (e.g., desktop virtualization servers), storage disks, networking hardware, and other physical resources may be used to provision virtual desktops, and/or provide access to shared applications.

SUMMARY

A computing device may include a memory and a processor cooperating with the memory and configured to access a plurality of connection lease templates corresponding to published resources stored in a shared memory. The processor may further be configured to provision connection leases for respective client devices using a connection lease issuing appliance based upon the stored connection lease templates. The connection leases may be provisioned on demand responsive to selection of the published resources by the client devices, and the connection leases may provide instructions for connecting the client devices to virtual computing sessions corresponding to the published resources.

In an example embodiment, the templates may comprise initial templates including a first connection parameter, and intermediate templates including the first parameter and a second connection parameter. By way of example, the first connection parameter may comprise at least one of a published resource delivery group and a common connection parameter. Also by way of example, the second connection parameter may comprise at least one of an application group, a resource entitlement, a session sharing restriction, a tagging parameter, and a resource location order.

In some example embodiments the processor may be further configured to generate and store in the shared memory intermediate connection leases based upon the connection lease templates using the connection lease issuing appliance, with each intermediate connection lease being associated with a respective user. Moreover, the processor may be configured to provision the intermediate connection leases into final connection leases for respective client devices associated with each user. In accordance with another example, the processor may be further configured to renew all of the final connection leases associated with a given user before the end of an expiration period based upon usage of at least one of the final connection leases associated with the given user during the expiration period.

A method may include accessing a plurality of connection lease templates corresponding to published resources stored in a shared memory using a connection lease issuing appliance. The method may further include provisioning connection leases for respective client devices using the connection lease issuing appliance based upon the stored connection lease templates. The connection leases may be provisioned on demand responsive to selection of the published resources by the client devices, and the connection leases may provide instructions for connecting the client devices to virtual computing sessions corresponding to the published resources.

A related computing system may include a plurality of client devices configured to select published resources corresponding to virtual computing sessions, and a connection lease template appliance configured to generate a plurality of connection lease templates corresponding to the published resources and store the connection lease templates in a shared memory. The computing system may also include a connection lease issuing appliance configured to access the connection lease templates stored in the shared memory and provision connection leases for respective client computing devices based upon the connection lease templates, where the connection leases are provisioned on demand responsive to selection of the published resources by the client devices. The computing system may also include at least one virtual delivery appliance configured to connect the client devices to respective virtual computing sessions based upon the connection leases.

DETAILED DESCRIPTION

A goal of using connection leases is to allow users to connect to their virtual leased workloads and/or services even if the connection lease infrastructure is not reachable, which could be for a variety of reasons. However, connection lease generation may be an expensive process because it involves multiple query and processing operations. Furthermore, the process may also be fairly complicated when it comes to delivering published apps and desktops, involving managing virtual delivery appliances, catalogues, delivery groups, application groups, and published resources, for example.

In addition, since connection leases are a static snapshot of user entitlements that are refreshed relatively infrequently, the user will typically not have the latest real-time information at time of connection. As an alternative, using one-time legacy connection files (e.g., Independent Computing Architecture (ICA) files) while the system is reachable, and using connection leases only when the system is down, may also help address these gaps. Yet, this may also result in different code paths being executed, and therefore potentially inconsistent user experience (e.g., long vs. short logon time), and the risk of malfunction when a rarely executed connection lease code path is relied upon for resiliency. The systems and methods disclosed herein advantageously help address these technical challenges by providing composite and/or template-based connection lease generation approaches, resulting in less processing operations and real or near real-time lease updating capabilities.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
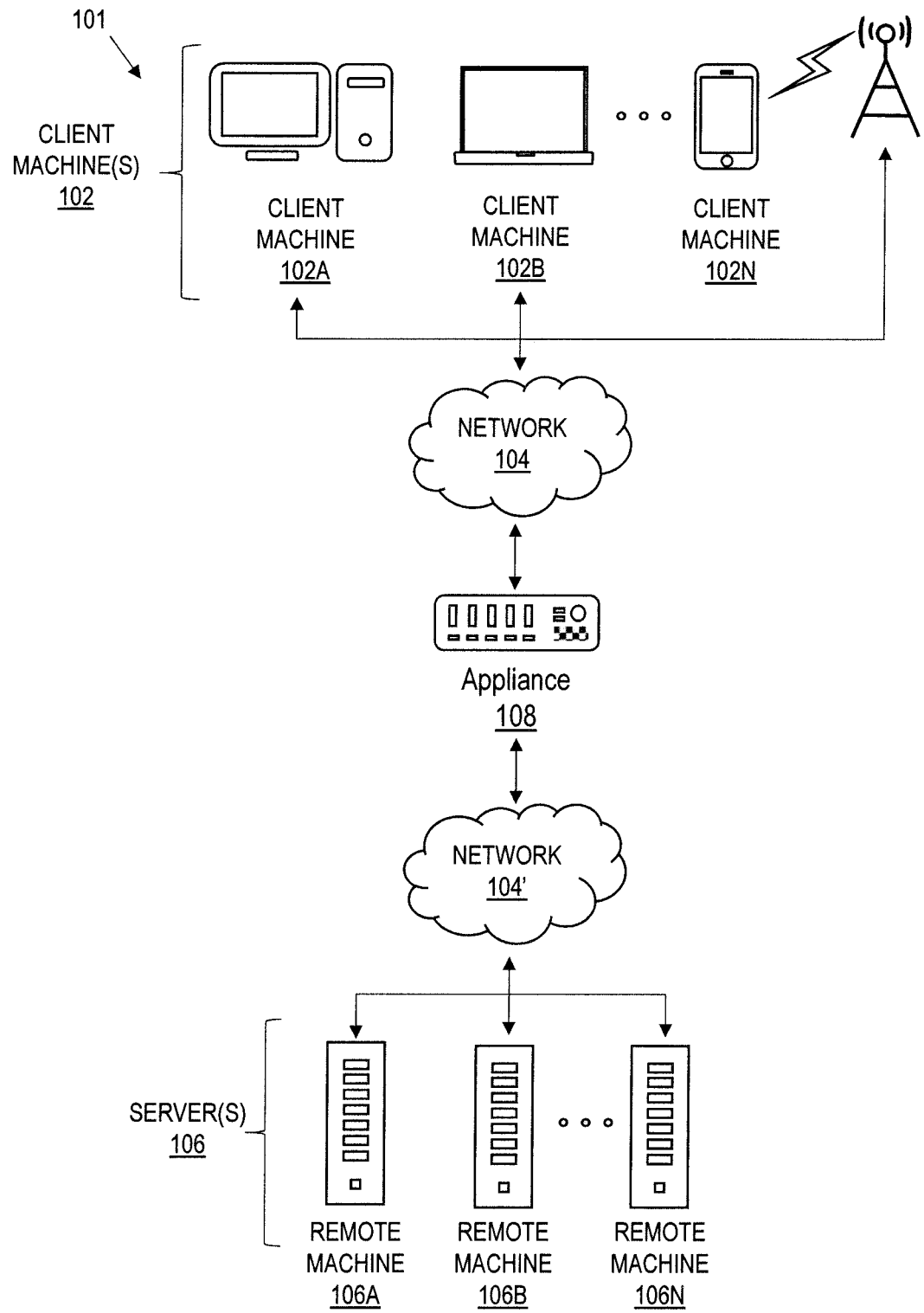
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); software-defined networking in a wide area network (SD-WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

One particularly advantageous implementation of SD-WAN enterprises is provided by Citrix SD-WAN, which allows enterprises to render their WANs with more scalability, and in cost-effective that is ready to connect to the cloud. Citrix SD-WAN contains an integrated database and deep packet inspection to identify applications, including individual SaaS applications, and intelligently steer traffic from the branch to the internet, cloud, or SaaS. Moreover, Citrix SD-WAN also provides the ability to route traffic from the branch to the internet via a secure web gateway, delivering cloud-based security including firewall, URL filtering, and usage accounting.

Figure 2:
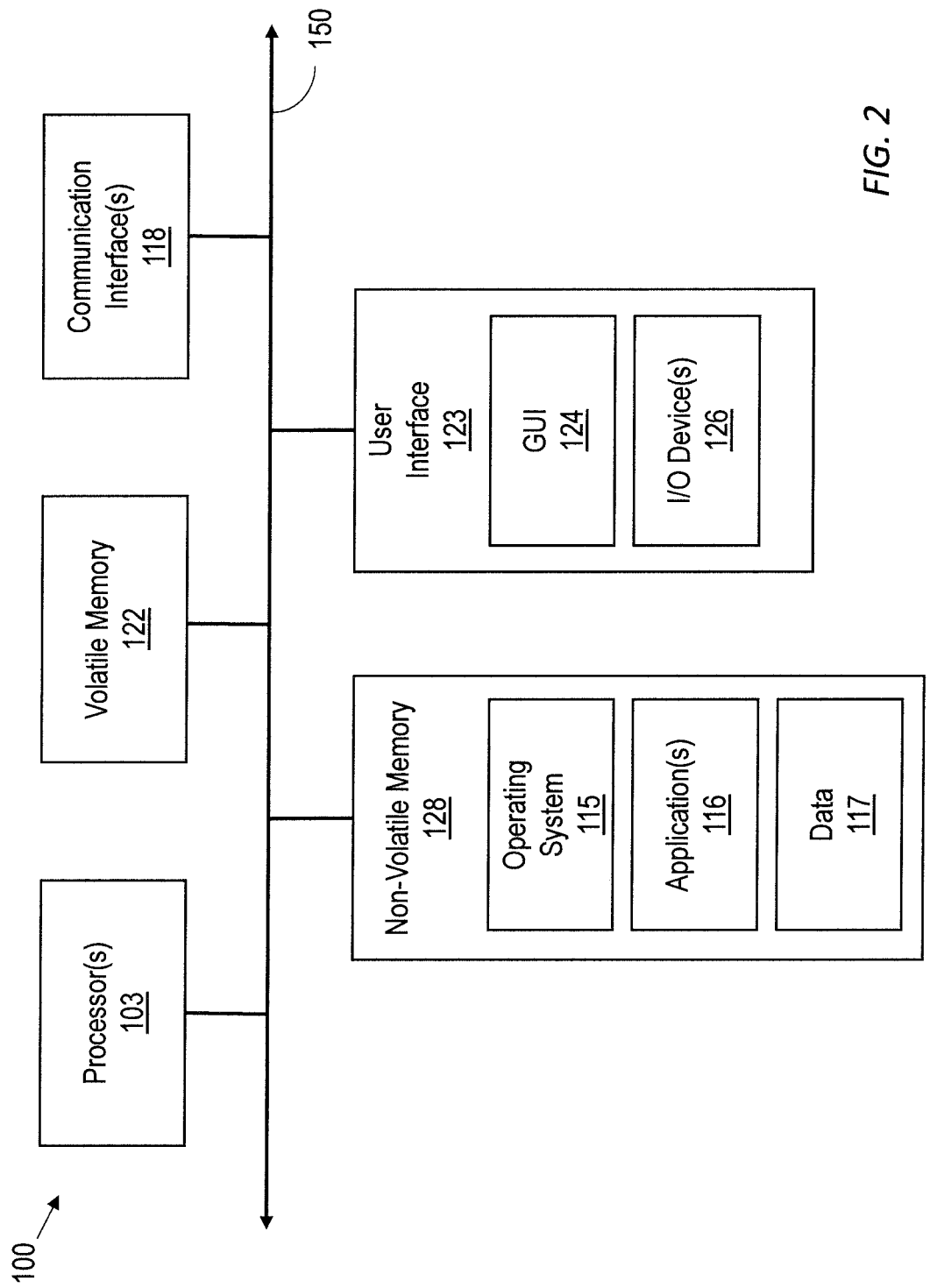
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a LAN, a WAN or SD-WAN, a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

An example virtualization server 106 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops, also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
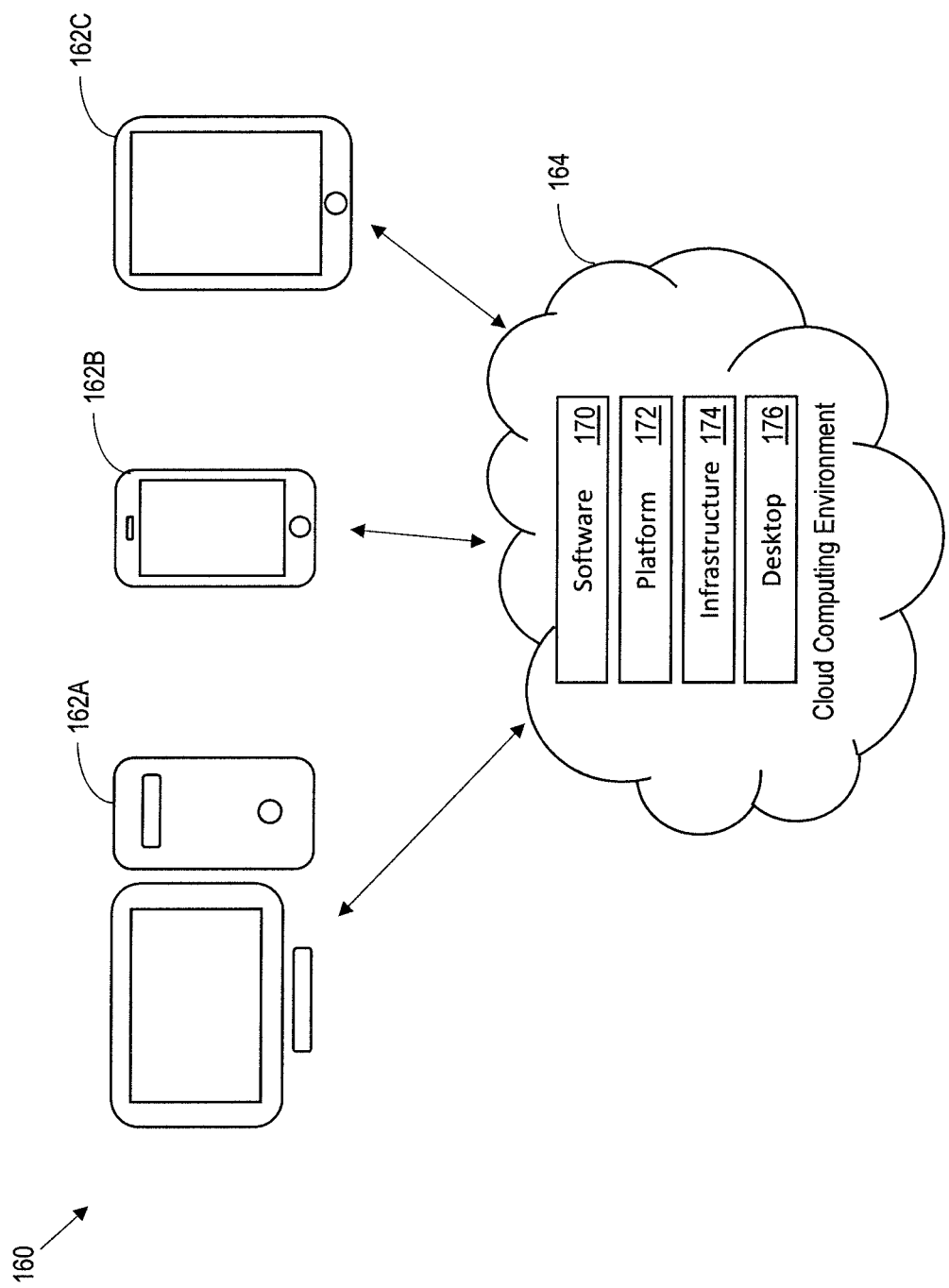
FIG. 3 is a schematic block diagram of a cloud computing environment in which various aspects of the disclosure may be implemented.

Referring to FIG. 3, a cloud computing environment 160 is depicted, which may also be referred to as a cloud environment, cloud computing or cloud network. The cloud computing environment 160 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 160, one or more clients 162A-162C (such as those described above) are in communication with a cloud network 164. The cloud network 164 may include back-end platforms, e.g., servers, storage, server farms or data centers. The users or clients 162A-162C can correspond to a single organization/tenant or multiple organizations/tenants. More particularly, in one example implementation the cloud computing environment 160 may provide a private cloud serving a single organization (e.g., enterprise cloud). In another example, the cloud computing environment 160 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 160 may provide a hybrid cloud that is a combination of a public cloud and a private cloud. Public clouds may include public servers that are maintained by third parties to the clients 162A-162C or the enterprise/tenant. The servers may be located off-site in remote geographical locations or otherwise.

The cloud computing environment 160 can provide resource pooling to serve multiple users via clients 162A-162C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 160 can provide on-demand self-service to unilaterally provision computing capabilities (e.g., server time, network storage) across a network for multiple clients 162A-162C. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 160 can provide an elasticity to dynamically scale out or scale in responsive to different demands from one or more clients 162. In some embodiments, the cloud computing environment 160 can include or provide monitoring services to monitor, control and/or generate reports corresponding to the provided shared services and resources.

In some embodiments, the cloud computing environment 160 may provide cloud-based delivery of different types of cloud computing services, such as Software as a service (SaaS) 170, Platform as a Service (PaaS) 172, Infrastructure as a Service (IaaS) 174, and Desktop as a Service (DaaS) 176, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOGGLE APPS provided by Google Inc., SALESFORCE provided by Salesforce.com Inc. of San Francisco, Calf., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
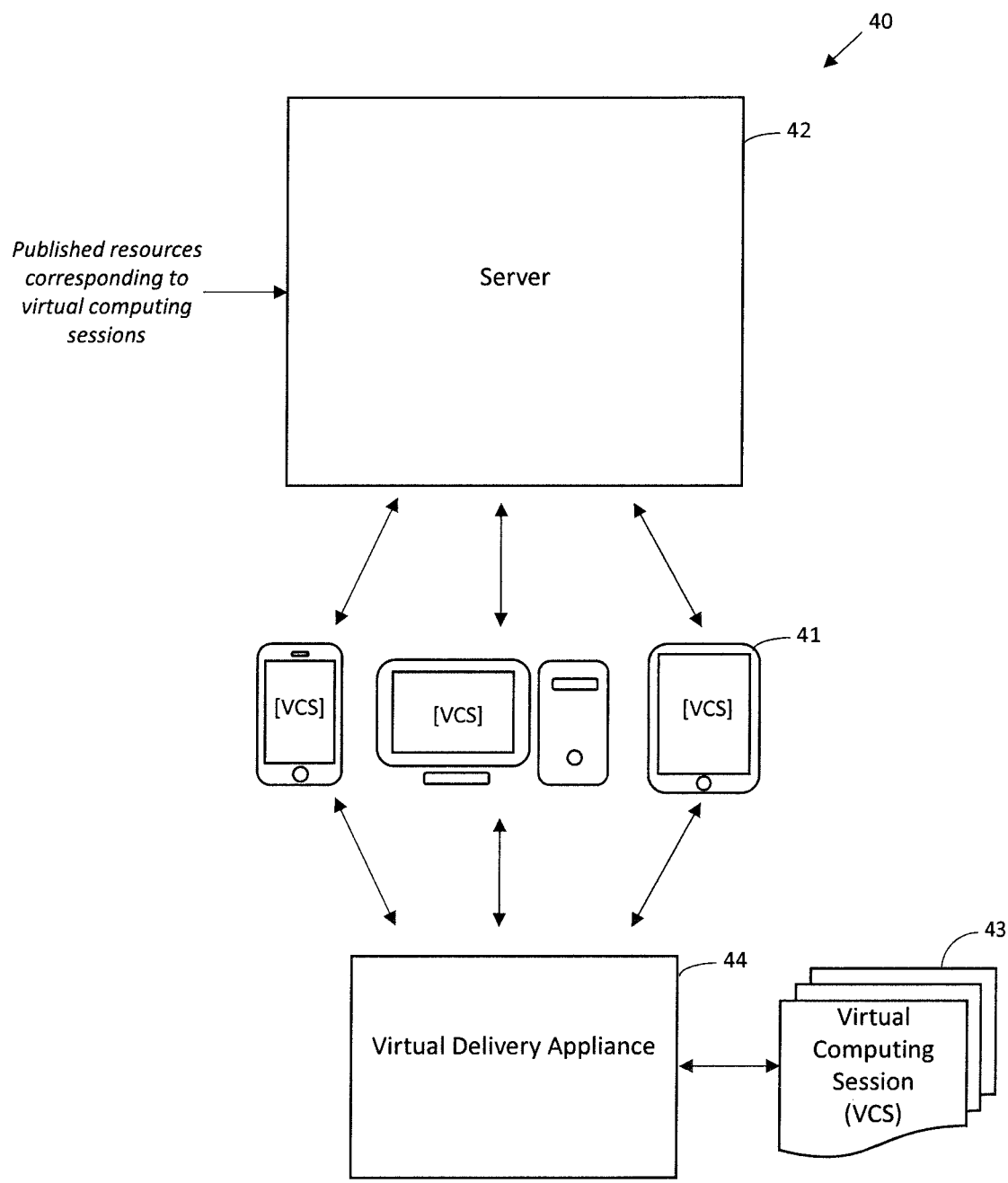
FIG. 4 is a schematic block diagram of a computing system providing virtual computing session access based upon component-based connection leases in accordance with an example embodiment.

Turning now to FIG. 4, a computing system 40 which advantageously provides an efficient composite (modular) connection lease (CL) design for connecting client devices to virtual computing sessions is first described. One example architecture for providing access to virtual computing sessions is Citrix Virtual Apps and Desktops (CVAD) from the present Applicant Citrix Systems, Inc. Citrix Virtual Apps is an application virtualization platform that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or an on-prem configuration.

Such computer virtualization infrastructures may utilize Independent Computing Architecture (ICA) files for authenticating client devices to access respective virtual sessions and computing resources. ICA is a protocol designed for transmitting Windows graphical display data as well as keyboard and mouse input over a network. ICA files contain short-lived Secure Ticket Authority (STA) and logon tickets. The STA ticket may be used to authorize a connection to a virtual delivery appliance (e.g., Citrix Virtual Delivery Agent (VDA)) via a Gateway (e.g., Citrix Gateway). The logon ticket may single-sign-on (SSOn) the user into the virtual computing session. In the case of CVAD, this is done through a "high-definition" experience (HDX) session, which may be available to users of centralized applications and desktops, on different client devices and over different networks. Citrix HDX is built on top of the ICA remoting protocol. With any network infrastructure, remote or otherwise, security from external attacks (e.g., interception and replay attacks) is always a significant concern. For example, connection leases provide long-lived authorization to establish a network connection to a virtual delivery appliance.

Since connection leases are long-lived, e.g., a few hours to weeks based on policies, and therefore the attack opportunity window is much longer, the security requirements can be more critical. Therefore, connection leases are encrypted and signed. Connection leases may also be revoked to cope with events such as a stolen device, compromised user account, closed user account, etc. Connection lease revocation can only be applied when a client/endpoint device or host (e.g., virtual delivery appliance) is online with respect to a CL Issuing Service (CLIS) or Broker, which is not a requirement for use of a connection lease, since connection leases are meant to be used in offline mode.

Connection lease generation may be an expensive process because it involves multiple query and processing operations. For example, in some virtualization systems a broker performs operations, including running multiple store procedures and checking static as well as real-time data, when a single user triggers a launch of a single app. The process may be fairly complicated when it comes to delivering published apps and desktops, involving managing virtual delivery appliances, catalogues, delivery groups, application groups, and published resources, for example.

Configurations and policies such as various one-to-one or one-to-many associations, priorities, zones and preferences, session sharing, tagging, etc., complicate the resolution of a single launch request to a connection (e.g., ICA) file. Furthermore, the generation of connection leases for a single user would involve the determination of all possible apps, desktops, resource locations and associated configurations the user is entitled to, including various connection circumstances (internal, external). In terms of load on the broker and connection lease management services, this will be the equivalent of a user launching all their apps and desktops at the same time from different locations, e.g., 100 apps times 2. Multiplied by the number of users in an organization, e.g., 10,000 users, results in 2 million effective launch requests to the broker. For example, everyone would come to work on Monday, connects to the system, which triggers connection lease renewals. This could result in service failures from overloading the system with too many requests at once. Even for a single active user, published resource enumeration (e.g., providing client devices with a listing of available apps and desktops) could become very slow, timeout or fail, resulting in a poor or broken user experience (UX) as it would require generation of many leases for the user.

Techniques such as Application Programming Interface (API) throttling or having the endpoints request connection leases at various (including random) times could potentially help smooth out the load on the broker, although resulting in added complexity.

Connection lease data per published resource may be relatively small, e.g., in the order of kilobytes. However, in some circumstances, users may be entitled to a relatively large number of apps. Although rare, entitlements may reach thousands of apps. Furthermore, kiosk/shared devices may host multiple users, and thin clients may have a small amount of available memory and thus difficulty dealing with the large amount of data associated with numerous entitlements. In addition, sending a large monolithic connection lease upon every launch, e.g., a Citrix HDX launch, would consume more bandwidth and slow down the connection process for the given user.

As noted above, a goal of using connection leases is to allow users to connect to their leased workloads and/or services even if the system is not reachable. However, since connection leases are a static snapshot of user entitlements, which is being refreshed relatively infrequently (e.g., once a week), the user would not have the latest real-time information at connection time that does not reflect updates to published resources or connection infrastructure, for example. For example, this information may include one or more of the following: user entitlement updates, e.g., an administrator has added or removed an app; virtual delivery appliance power or load management updates (e.g., virtual delivery appliances are up, down or overloaded); user session location (including in some cases pooled desktops); information on all currently running apps that have been launched in a session from a different device, etc.

Alternatively, using one-time legacy connection files (e.g., ICA files) while the system is reachable, and using connection leases only when the system is down, may also help address these gaps. However, this may also result in different code paths being executed, and therefore potentially inconsistent user experience, e.g., long vs. short logon time, and the risk of malfunction when a rarely executed connection lease code path is relied upon for resiliency.

The systems and methods disclosed herein advantageously help address the above-noted technical challenges, as well as providing additional benefits. The system 40 of FIG. 4 illustratively includes a plurality of client devices 41 (such as those noted above) configured to select published resources corresponding to virtual computing sessions 43. As will be discussed further below, the published resources are the available desktop, apps, etc., that users are able to remotely access on the client devices 41 within virtual computing sessions 43 that are hosted by an on-prem or cloud-based virtualization server. The system 40 further illustratively includes a server 42 configured to generate connection leases for the published resources that are selected by the client devices 41. More particularly, each connection lease includes a published resource lease component unique to the selected published resource, and a common lease component shared by a plurality of different published resources, as will be discussed further below. The computing system 40 also illustratively includes one or more virtual delivery appliances 44 configured to connect the client devices 41 to respective virtual computing sessions 43 based upon the connection leases.

Figure 5:
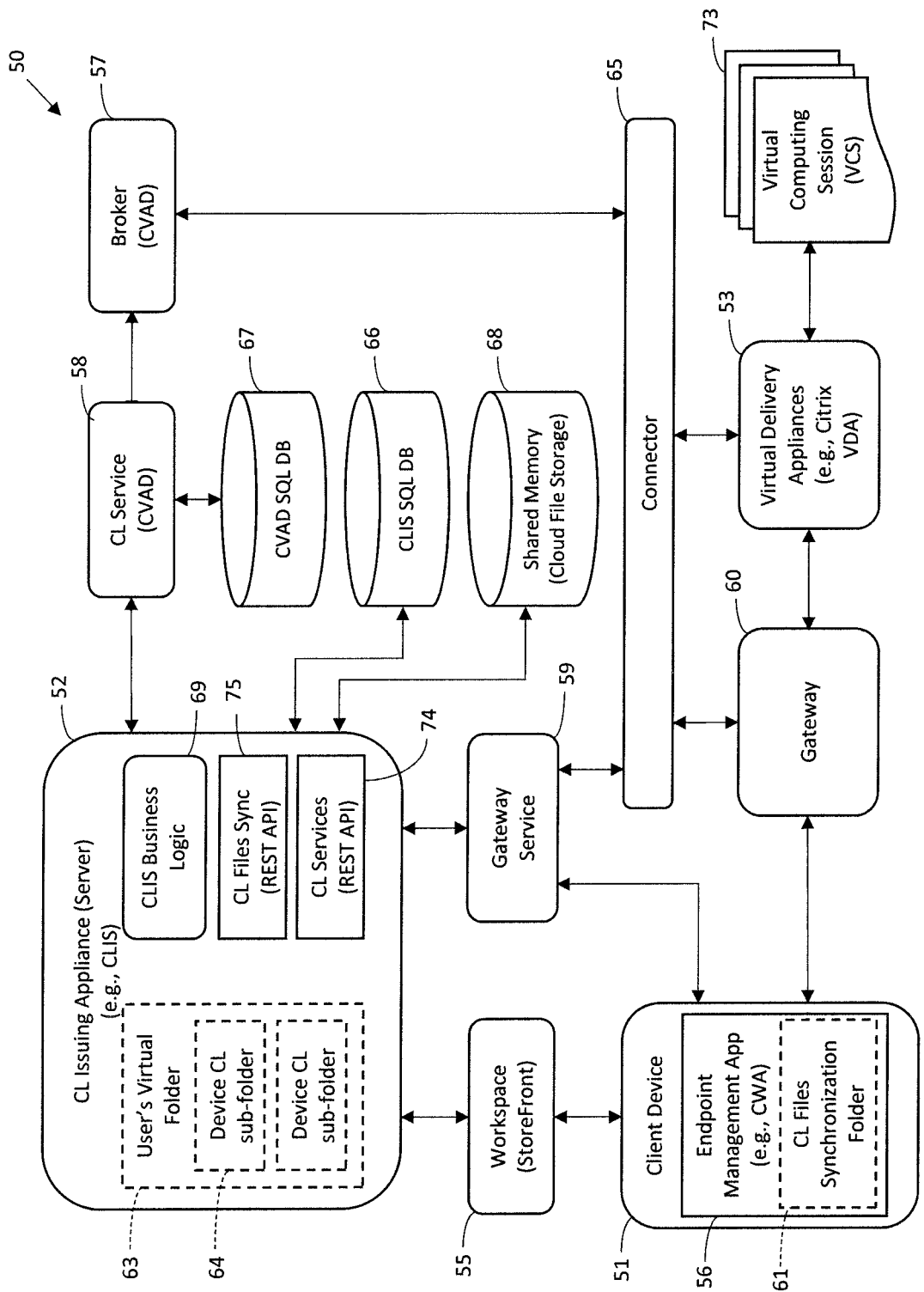
FIG. 5 is a schematic block diagram of an example implementation of the system of FIG. 4.
Figure 6:
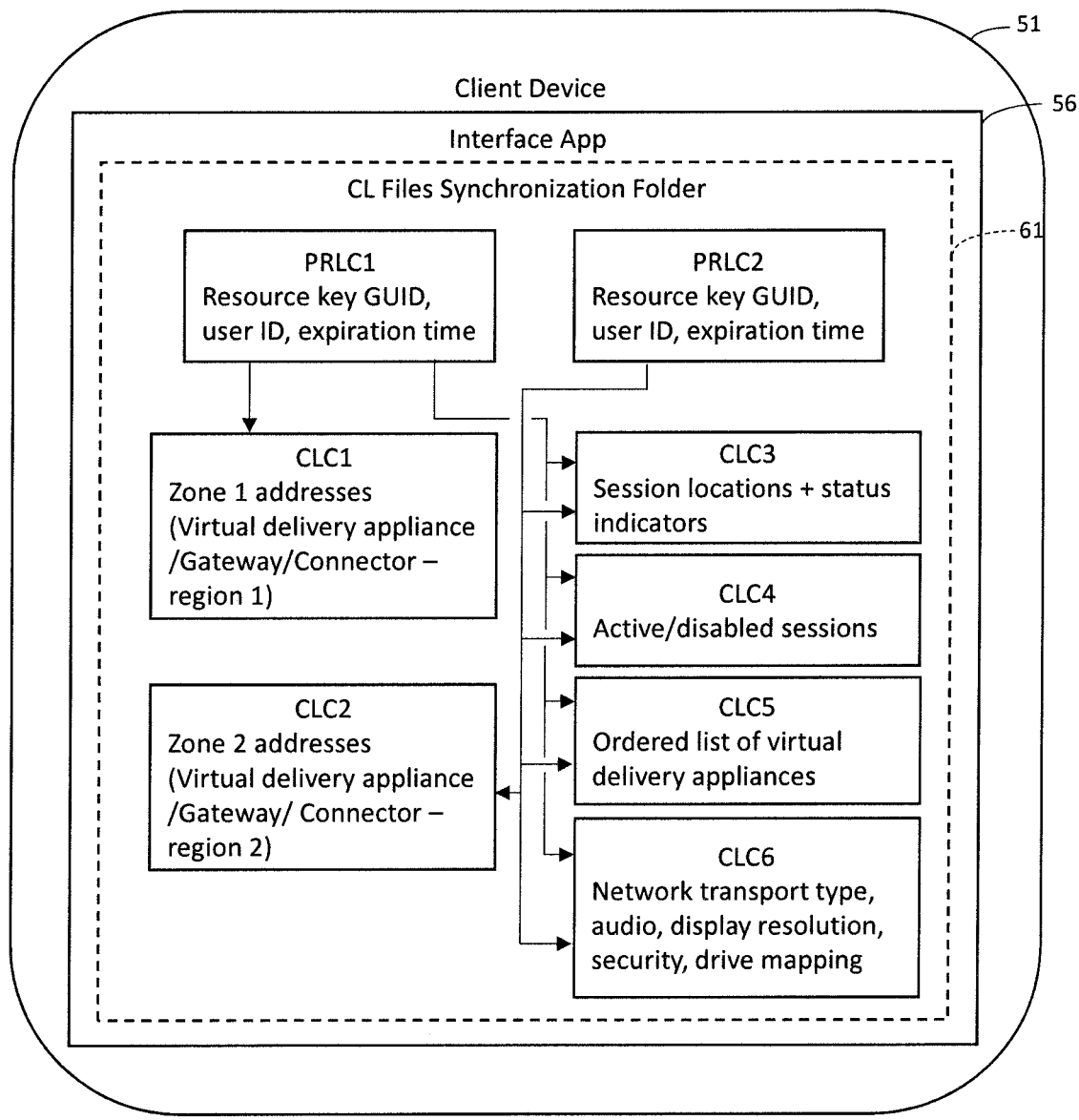
FIG. 6 is a schematic block diagram of the client device shown in FIG. 5 illustrating the connection lease file sharing folder and connection lease components thereof in accordance with an example implementation.
Figure 7:
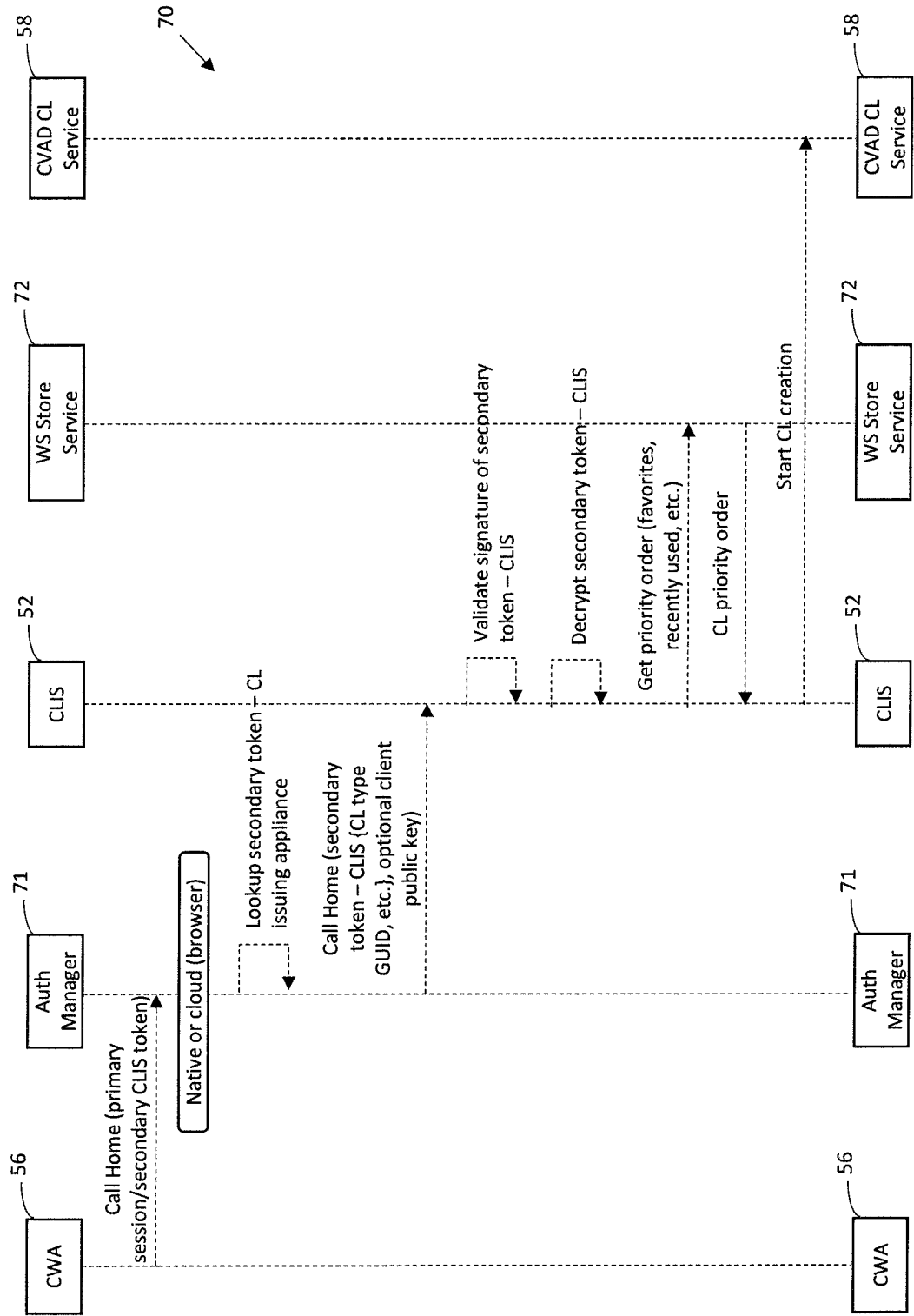
FIG. 7 is a sequence flow diagram illustrating a client device call home sequence that may be performed within the system of FIG. 5 to trigger connection lease creation in accordance with an example embodiment.

Referring additionally to FIGS. 5-7, the foregoing will be further understood with reference to an example connection lease management system 50 and associated operations illustrated in the sequence diagram 70, which are implemented within the Citrix Workspace platform. However, it will be appreciated that this is but one example virtualization platform in which the connection lease techniques described herein may be utilized, and that other platforms or implementations may be used in different embodiments.

The system 50 advantageously provides for efficient composite connection lease management in a background mode, meaning portions of the connection lease management may be performed ahead of time and do not have to be performed immediately responsive to a connection lease request (on demand), with autonomous synchronization of connection leases. As will be discussed further below, this autonomous synchronization of lease updates may be performed by the system 50 after the lease has been generated and is still active, yet without having to re-generate the entire lease. In the illustrated example, the above-described lease issuing server 42 is implemented using the Connection lease Issuing Service (CLIS) 52, which is part of Citrix Workspace. Client devices 51 interface with the CLIS 52 via Citrix Workspace StoreFront 55, as well as a gateway connection lease service 59. Also in the illustrated example, the client device 51 runs an endpoint management application, which in this example is Citrix Workspace App (CWA) 56, which allows the client device to interface with Workspace StoreFront 55. CWA 56 enumerates published resources through a Workspace Store Service 72, which may be done on an independent and asynchronous basis. The system 50 further illustratively includes a shared memory (here cloud file storage 68) associated with the CLIS 52 which may be utilized in the connection lease generation process, as will be discussed further below. Furthermore, both the CLIS 52 and the connection lease service 58 (for CVAD) have their own respective CLIS database 66 (e.g., SQL) and CVAD CL Service database 67 (e.g., SQL) in the illustrated example. Moreover, the CLIS 52 includes business logic 69 to perform the noted processing operations described herein.

Furthermore, in this example CWA 56 calls home to the CLIS 52, and the CLIS orchestrates connection lease creation by calling into resource providers hosting the published resources, as will be discussed further below. As seen in FIG. 7, this process begins when CWA 56 initiates the call home to an authentication (auth) manager 71, which may include a primary session key/token that is relatively long-lived, and a secondary token associated with the CLIS 52. The authentication manager 71 may be embedded in a native or cloud-based (hosted) browser, for example, and upon receiving the call home it performs a lookup of the secondary token. The auth manager provides to the CLIS 52 the secondary token, and optionally a public key associated with the client device 51. Alternatively, the client device 51 public key may previously be stored in the cloud as part of device registration for long-lived refresh tokens.

The CLIS 52 validates a signature of the secondary token and decrypts is contents to perform entitlement checks (e.g., what published resource the client device 51 is entitled to) and determine the type of connection lease that is required (e.g., CL Type GUID, etc.). The CLIS 52 may then obtain a priority order for the connection leases from Workspace Store Service 72, and then trigger a CVAD connection lease service 58 to perform background connection lease creation in the cloud, as will be discussed further below. The system 50 further illustratively includes a CVAD SQL database 67 associated with the CVAD connection lease service 58.

Use of the call home operation from CWA 56 advantageously reduces load on system resources by reserving the creation of connection leases for active users and their registered devices 51, as opposed to all licensed users. Moreover, this may advantageously help to simplify operations performed by CWA 56, in that it will not be required to provide a long list of resource key GUIDs, etc. Moreover, not everyone who enumerates the store may be entitled to receive connection leases. Specifying the connection lease types a user-client device 51 is interested in may also be important. For example, desktop device 1 of user A may require desktop connection leases only, while mobile device 2 of the same user A may require a mobile connection lease.

In one example implementation, the client device 51 may call home periodically, which may provide a relatively robust approach in situations such as a cloud platform failure, REDIS (an open source, in-memory data structure store) is cleared, or any other internal failure in cloud services occurs. In some embodiments, a progressive web app (PWA) (web component) or supply-side platform (SSP) (native component) may be utilized for calls home. PWA offers the benefit of code sharing and updates from the Cloud. PWA may call home every time it is loaded. Another approach is for a periodic or event-based call home, which may utilize additional PWA Service Worker support, which runs in background. In one approach, a call home may be performed periodically, upon store refresh, or upon PWA (re)start, for example. In other approaches, CWA 56 (PWA or SSP) may check if connection leases are available. For example, a failure might have occurred during the sync or in the cloud. If the required connection leases are not found after a certain timeout, CWA 56 may then proactively perform a call home.

A call home may not trigger a refresh or creation of connection leases every time it is performed. For example, if a final user-device connection lease already exists, or creation of intermediate connection leases for the user is in progress, as will be discussed further below, then the CLIS 52 does nothing. Otherwise, the CLIS 52 triggers CL creation.

As noted above, CLIS 52 generates connection leases in a composite or component (e.g., modular) fashion. More particularly, each connection lease includes a published resource lease component (PRLC), and one or more common lease components (CLCs). A PRLC is a relatively small published resource lease component (PRLC) that is unique to the particular public resource for which the connection lease is being created. A PRLC points to other CLCs, which are shared by multiple different published resources (and therefore PRLCs), and may include information such as common parameters, direct resource locations, gateway resource locations, resource location ordering, etc., for example. In one example embodiment, the PRLC and CLC lease components may be implemented as linked JSON docs, although other suitable approaches may be used in different embodiments. Among others, one advantage of a modular lease structure is that it may help reduce the need for client device (e.g., CWA 56) software updates with respect to connection leases, and many needed changes may be implemented through updates to the lease components (e.g., JSON docs) themselves.

Continuing with the example in which the connection leases are implemented as composite JSON documents which are linked together, a respective PRLC is generated for each client device 51 per published resource, such as a published desktop or a published app in the case of CVAD. A PRLC may be implemented as a relatively small JSON document that references other (CLC) JSON documents. As a whole, a connection lease may be considered to be a composite made of a master/aggregating JSON file (the PRLC) that references CLCs, which are also JSON files.

In an example implementation, each connection lease JSON file includes a cryptographic signature from the CLIS 52. Each connection lease file may also include a manifest that is in cleartext. Relevant sections of a connection lease may also be encrypted for security reasons. Examples of CLCs that may be referenced by a PRLC include: common parameters (e.g., common ICA parameters for CVAD such as network transport type, audio settings, display resolution settings, security settings, drive mapping enablement settings, etc.), also known as "Comp-Params"; resource locations direct (e.g., locations of resources when a gateway connection lease service 59 is not present or available), also known as "Comp-ResLocsDirect"; resource locations gateway (e.g., locations of resources when the gateway connection lease service 59 is present), also known as "Comp-ResLocsGateway"; and resource locations order (e.g., defining the order of resource locations), also known as "Comp-ResLocsOrder". A reference mechanism used to link a PRLC to a CLC may be the filename of the CLC, for example, although other reference mechanisms may also be used.

More particularly, the PRLC may include a reference section that lists the filenames of the CLCs that it references. As noted above, a CLC may be referenced by multiple PRLCs. This may provide several technical advantages. For example, a CLC may be updated without having to update the (potentially numerous) PRLCs that reference it. Furthermore, this approach may also reduce the storage space needed for the CLCs, since CLCs are common among potentially many PRLCs and therefore only need to be stored once (not multiple times for different connection leases). Additionally, not all CLCs need to be sent to all entities (e.g., client devices 51, a gateway 60, virtual delivery appliance 53 (e.g., Citrix VDA), the CVAD broker 57, etc.) For instance, a common parameters CLC may be utilized by the client device 51 but not other entities, which helps to reduce network traffic compared to having one monolithic connection lease.

To avoid tampering via connection lease file renaming, in some embodiments each signed connection lease may include a JSON member named "filename" that includes the name of the JSON file of the connection lease. The filename of a PRLC may follow the pattern:
CL-<[App/Desk]Name>-<ResourceKey (GUID)>.V<N>.json
The following is an example of a PRLC filename:
CL-Desktop1-9D47CB39-BCD6-4668-8BEB-AE135CCB4D10.V1.json
In one example embodiment, the PRLC files may be versioned (with a dot notation in the form of .V1, .V2, [ . . . ] .VN) before the JSON file extension (.json). The filename of a CLC may follow the pattern:
CL-Comp-<CompType>-<GUID>.V<N>.json,
where <CompType> can be "Params", "ResLocsDirect", "ResLocsGateway" or "ResLocsOrder", for example.
The following is an example of a CLC filename:
CL-Comp-Params-BB009218-98F6-4AB2-A4D7-0F007C2672C7.V2.json
In one example embodiment, the CLC files may be versioned (with a dot notation in the form of .V1, .V2, [ . . . ] .VN) before the JSON file extension (.json). An example of a PRLC reference section is the following (JSON object):

```
"comp-references": {
    "r1": "CL-Comp-Params-BB009218-98F6-4AB2-A4D7-0F007C2672C7.V2.json",
    "r2": "CL-Comp_ResLocsDirect-8ED78F81-AFD7-46E0-B19E-E6291FB7AD1F.V1.json",
    "r3": "CL-Comp_ResLocsGateway-9CA78F81-BAD7-46E7-B19E-E6291FB7BC2F.V1.json",
    "r4": CL-Comp-ResLocsOrder-4DD357F4-C310-4FA9-A7E1-862650FCD853.V5.json"
}
```

The reference member names are in the form r<N>, for instance r1, r2, r3, etc. Each reference is a JSON filename that is in the same sync folder.

Again, connection lease files may follow a specific format, which in the present example is JSON, although other structured type/value formats (e.g., XML, ASN.1, etc.) may also be used. In the description below, object means "JSON object" and array means "JSON array"

Top-level (unnamed) object
Document object
Manifest object (cleartext)
Component References object (cleartext, optional)
Payload (encrypted with symmetric key)
Signatures—array of objects
Encrypted Symmetric Key—array of objects The payload may be encrypted with a symmetric key. Moreover, the symmetric key may be encrypted with the public key of the entity that receives the connection lease. In one example embodiment, since multiple entities may receive the connection lease successively (e.g., client device 51, gateway 60, virtual delivery appliance 53, etc.), the symmetric key is accordingly encrypted multiple times with the public keys of the destination entities. In another embodiment, the symmetric key may be initially encrypted for the client device 51 only. Then, during a connection lease exchange protocol phase, after establishing a chain of trust to a corresponding gateway 60 or virtual delivery appliance 53, the initiating entity (e.g., the client device 51 of the gateway) re-encrypts the symmetric key with the receiving entity's public key (e.g., the gateway or virtual delivery appliance public key respectively), before sending it over the established connection.

Where JSON is used as the connection lease format, the signatures may be in JSON Web Signature (JWS) format (RFC 7515), for example. Also by way of example, the symmetric key may be in JSON Web Key (JWK) format (RFC 7517), and may be encrypted with the public key of the destination entity.

Furthermore, each PRLCs and CLCs may include a manifest (e.g., JSON object) that is in cleartext and may include one or more of the following common members: Lease Identifier (leaseId), which is a unique GUID per connection lease; Lease Type (leaseType), which is a descriptive name of the type of connection lease (e.g., Resource, Resource-Comp-Params, Resource-Comp-ResLocsDirect, Resource-Comp-ResLocsGateway, Resource-Comp-ResLocsOrder); Lease Type Key (leaseTypeKey), which is a unique GUID per connection lease; File Name (fileName), which is the name of the file including the current connection (this is to prevent connection lease file renaming since each connection lease file includes a signature); From Template (fromTemplate), which is optional and contain the name of the template file that was used to generate the current connection lease (if any), as will be discussed further below; Workspace URL (workspaceUrl), which is the URL of the workspace the connection lease belongs to (e.g., "acme.citrix.cloud.com"); and Customer ID (customerId), which is the unique customer identifier (ID).

A PRLC manifest may also include one or more specific members, such as: Resource Key (resourceKey), which is a unique GUID per published resource (e.g. desktop or app for CVAD), and the resource key may be included in a PRLC JSON file name; valid from (validFrom), which is the date a PRLC becomes valid (e.g., in RFC 3339 format); Valid To (validTo) which is the date a resource CL becomes invalid (in RFC 3339 format); User Identity (userId), which is a unique identifier of the user for which the current resource connection lease applies to; Endpoint Device ID (endpointDeviceId), which is a unique identifier of the client or endpoint device the current resource connection lease applies to; Endpoint Device Public Key Thumbprint (endpoint device public thumbprint) which is a hash (e.g. SHA256) of the client or endpoint device public key; Broker Public Keys (brokerPublicKeys), which is an array of JWK containing the broker(s) public key(s). One or more of these members may be helpful to support signed allow, deny and redirect-target responses from the CVAD Broker 57 and virtual delivery appliance 53 in some implementations, if desired.

In one example embodiment, the connection lease files may be versioned. For example, the version may be included as part of the filename of each connection lease. Versioning of the connection lease files advantageously provides the ability to update a CLC (or multiple CLCs) without the need to update the PRLCs that reference it. To do this, the CWA 56 when resolving the references of a PRLC (which the CWA finds initially with the resource key that is included in the PRLC filename) performs a lookup for the referenced CLC filename and also any filenames with a newer version. If a newer version is found (or more than one), the latest version of a CLC is selected. For example, if a PRLC reference section includes the following:

```
"compReferences": {
    ....
    "r2": "CL-Comp_ResLocsDirect-8ED78F81-AFD7-46E0-
B19E-E6291FB7AD1F.V1.json",
    ....
}
``` with a CWA connection lease files synchronization folder 61 including both:
CL-CompResLocsDirect-8ED78F81-AFD7-46E0-B19E-E6291FB7AD1F.V1.json, and
CL-CompResLocsDirect-8ED78F81-AFD7-46E0-B19E-E6291FB7AD1F.V2.json,
Then the V2 version of the ResLocsDirect CLC is used.

In this regard, the CLC may be backward-compatible with its previous version. If the resolution of the references of a PRLC fails, then if there is a PRLC with an earlier version present, the CWA 56 attempts to use it, and starts resolving its references. If this fails or there is no earlier version present, then the CWA may perform a standard ICA launch using a conventional (non-modular) leasing approach, if desired. If a CLC needs to be updated in such a way that it is not backward compatible, then a new CLC (with a different Lease ID) may be issued and the associated PRLCs may be updated accordingly (with a newer version that reference the new CLC), for example.

In some implementations, CLCs may be set to never expire. If a CLC is out of date (e.g., new resource locations have been added), then it is replaced by a newer version of the file or an entirely different file (with a different Lease ID). Keeping previous versions of the connection leases in the synchronization folder 61 in conjunction with the connection lease reference resolution mechanism described previously (although the latest CLC is typically selected, if present) allows updating connection lease files (PRLCs and CLCs) without the need for a locking mechanism. For instance, the previous version of a PRLC (and its dependent CLC) may be kept when new connection lease files are being synchronized. If the synchronization is incomplete (e.g., a missing CLC) during a CWA 56 launch of a resource (and consequently the resolution of the references) fails, the CWA defaults to the previous version of the PRLC that is still present. If that too fails then an ICA launch may performed, as noted above.

In accordance with another example embodiment, instead of using a versioning approach during connection lease synchronization, a locking mechanism may be used. More particularly, during synchronization of connection lease files, a lock on the synchronization folder 61 is acquired by a Sync Engine 62 (which will be discussed further below with reference to FIGS. 10A-10B). The lock is released when the sync is complete. If the lock cannot be acquired (e.g., a CWA resource launch is being performed), then the Sync Engine 62 waits to be able to do so. Similarly, when the CWA 56 launches a published app or desktop, a lock on the synchronization folder 61 is acquired by the CWA 56. The lock is released when the connection lease files are not needed anymore (e.g., they can be copied to a dedicated location to hold the lock for the shortest possible amount of time). If the lock cannot be acquired (e.g., a sync is in progress), the CWA 56 waits to be able to do so for a set amount of time before giving up and performing an ICA launch, as described above.

The CLIS 52 maintains a virtual folder 63 including the connection leases for each user, which further illustratively includes sub-folders 64 with the leases for each of the user's respective devices provisioned for use with the system 50. That is, the contents of the synchronization folder 61 stored in a local secure storage at the client device 51 will correspond to those of the respective sub-folder 64 at the CLIS 52. In the example embodiment shown in FIG. 6, the synchronization folder 61 illustratively includes two PRLCs (PRLC1 and PRLC2), as well as six CLCs (CLC1-CLC6). Here again, each of the PRLCs corresponds to a respective published resource (e.g., app or desktop), and includes the appropriate resource key GUID, user ID, expiration time, etc., appropriate for the associated resource.

The first two CLCs (CLC1-CLC2) include a grouping of the appropriate entity addresses (e.g., virtual delivery appliance 53, gateway 60, connector 65, etc.) in a given zone or geographical region assigned to the client device 51 for accessing the particular resource. In the illustrated example, the PRLC1 references the CLC1 (Zone 1 addresses), while the PRLC2 references the CLC2 (Zone 2 addresses). Such assignments could vary based upon the physical location of the client device 51 at a given time. Moreover, in other embodiments, these addresses need not be grouped by zones, and different CLCs may be used for respective types of entities (e.g., virtual delivery appliance 53, gateway 60, connector 65, etc.). While only two PRLCs are shown in the illustrated example, it will be appreciated that other PRLCs may be included and also share CLC1 and/or CLC2, and that other CLC address files may also be included.

Furthermore, CLC3-CLC6 are shared by both the PRLC1 and PRLC2. More particularly, the CLC3 includes the locations of respective virtual computing sessions 73 (e.g., the location of the virtualization server or host running the virtual computing session), which the CLIS 52 may advantageously update responsive to changes in the locations. The CLC4 illustratively includes status indicators for active and disconnected virtual computing sessions 73, which allows the virtual delivery appliance 53 to re-connect the client device 51 to previously established active and disconnected sessions when applicable. Here again, updates to the CLC4 may similarly be performed in real-time as virtual computing sessions 73 are closed, etc.

The CLC5 includes an ordered list of the virtual delivery appliances 53 to which the client device 51 should connect to obtain a given virtual computing session 73. For example, different client devices 51 may be assigned different ordered lists of virtual delivery appliances 53 to help provide load balancing and/or desired availability across a group of virtual delivery appliances. Moreover, the CLC6 includes common parameters as noted above, which may include network transport types (e.g., User Datagram Protocol (UDP) vs. Transmission Control Protocol (TCP), etc.), audio setting display resolution settings, security settings, drive mapping settings (e.g., enabled/not enabled), etc. Here again, these CLCs may also be updated in real-time as changes occur (e.g., new virtual delivery appliances 53 come online, common parameters are changed, etc.).

In some embodiments, connection lease creation and updating may be prioritized. For example, the CLIS 52 may communicate with the Workspace Store Service 72 to retrieve a user connection priority order, e.g. favorites and recently used published resources. The CLIS 52 may also feed this priority order into the connection lease service 58. Thus, the most important connection leases will get created first.

Figure 11:
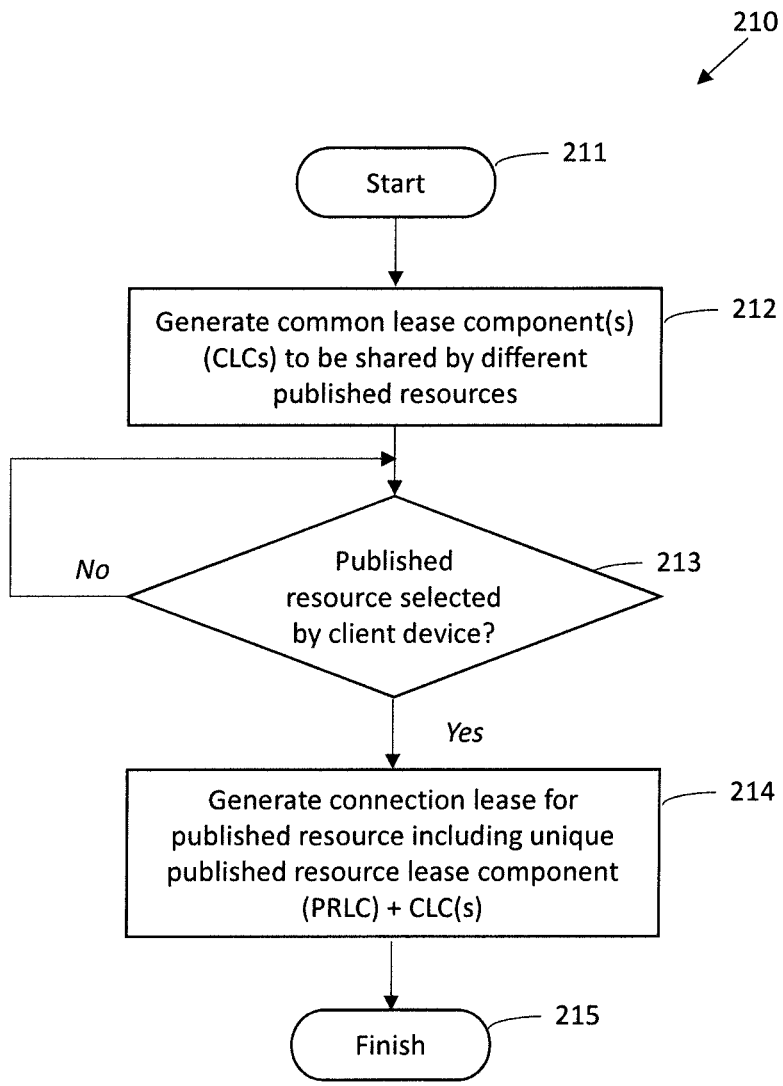
FIG. 11 is a flow diagram illustrating example method aspects associated with the server of the system of FIG. 4.

Referring additionally to the flow diagram 210 of FIG. 11, example method aspects associated with the computing system 40 of FIG. 4 are now described. The method begins (Block 211) with generating CLCs as described above, at Block 212. That is, since the CLCs are shared among different published resources, they may be generated before it is time to create the final connection lease, which may advantageously allow CLC processing to be performed at off-peak times and accordingly provide load balancing and/or more efficient use of computing resources, for example. The server 42 receives published resource selections by the client devices 41, at Blocks 213, and may generate the connection leases including the unique PRLCs and the associated CLCs based thereon and provides them to the client device, as discussed above, at Block 214, which illustratively concludes the method of FIG. 11. As discussed above, the connection leases provide the appropriate instructions for connecting the client devices 41 to virtual computing sessions 43 corresponding to the published resources (e.g., virtual apps and desktops, Web/SaaS apps, etc.) via the virtual delivery appliance 44.

Figure 8:
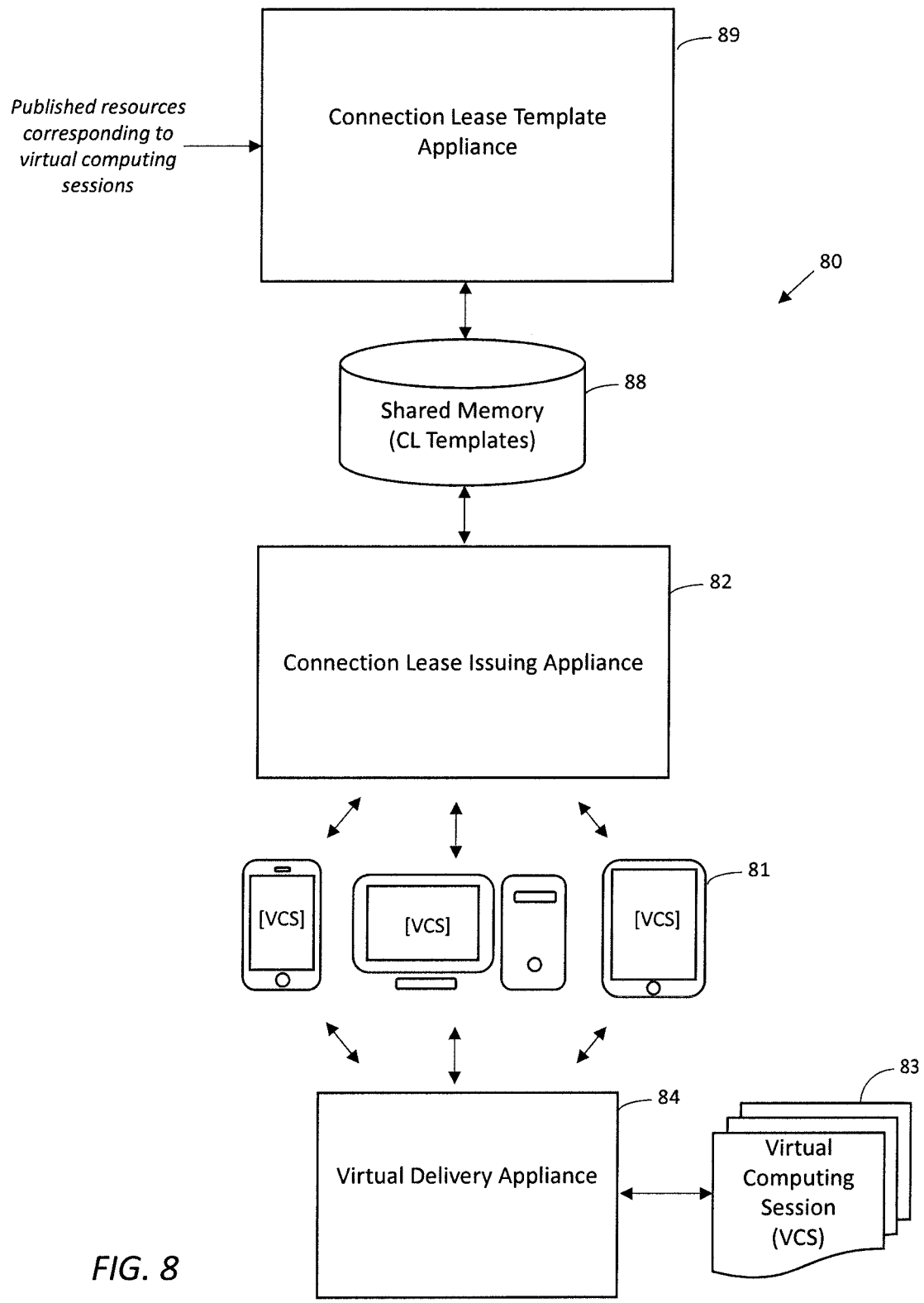
FIG. 8 is a schematic block diagram of a computing system providing virtual computing session access based upon template-based connection lease generation in accordance with an example embodiment.

Turning to FIG. 8, another advantageous connection lease generation aspect is now first described with reference to the illustrated computing system 80. As described above, the computing system 80 illustratively includes a plurality of client devices 81 that are configured to select published resources corresponding to virtual computing sessions 83 that are to be remotely accessed at the client device. The computing system 80 further illustratively includes a connection lease template appliance 89 configured to generate a plurality of connection lease templates corresponding to the published resources, and store the connection lease templates in a shared memory 88 (e.g., a cloud-based storage system). The computing system 80 also illustratively includes a connection lease issuing appliance 82 configured to access the connection lease templates stored in the shared memory 88 and provision connection leases for respective client devices 81 based upon the connection lease templates. The connection leases are provisioned by the connection lease issuing appliance 82 on demand responsive to selection of the published resources by the client devices 81, as will be discussed further below. The computing system 80 also illustratively includes one or more virtual delivery appliances 84, which are configured to connect the client devices 81 to respective virtual computing sessions 83 based upon the connection leases, as similarly discussed above.

Figure 9:
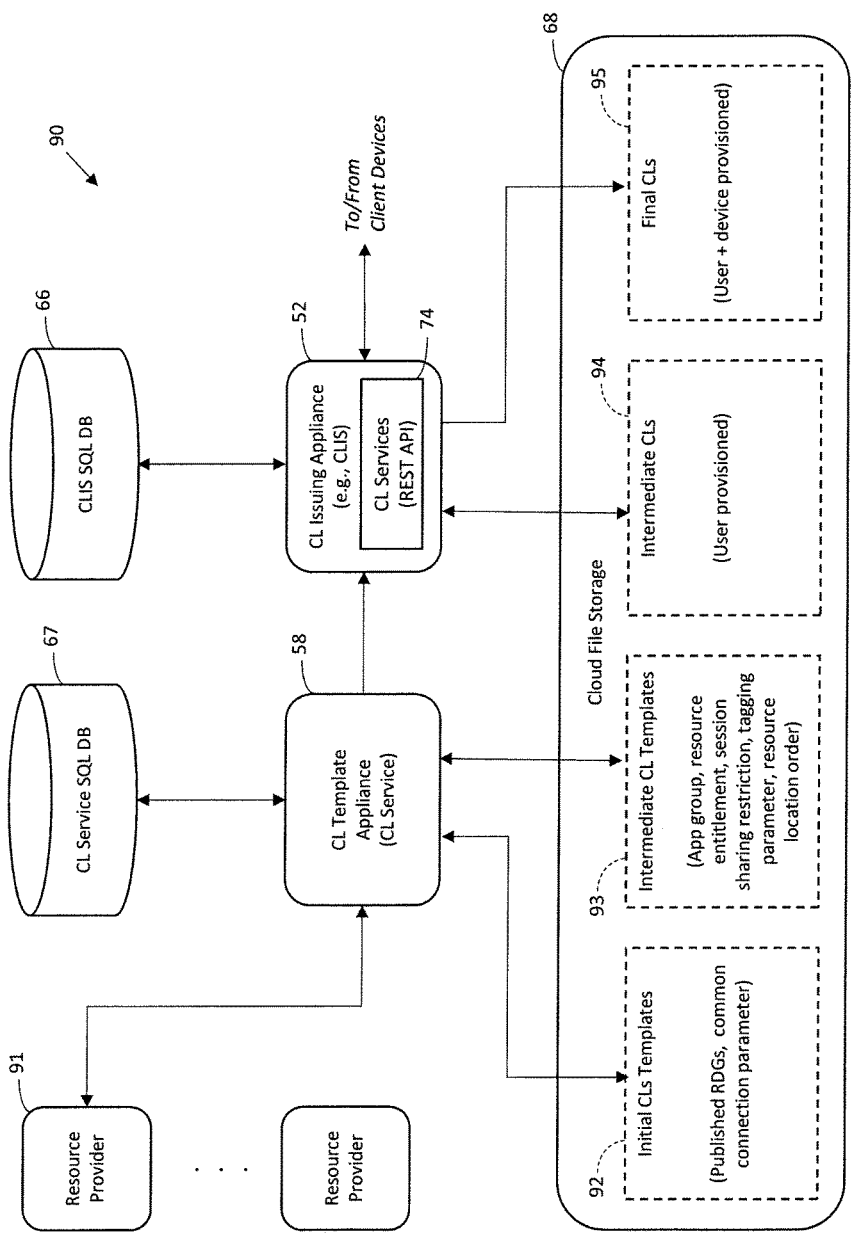
FIG. 9 is a schematic block diagram of an example implementation of the system of FIG. 8.
Figure 10A:
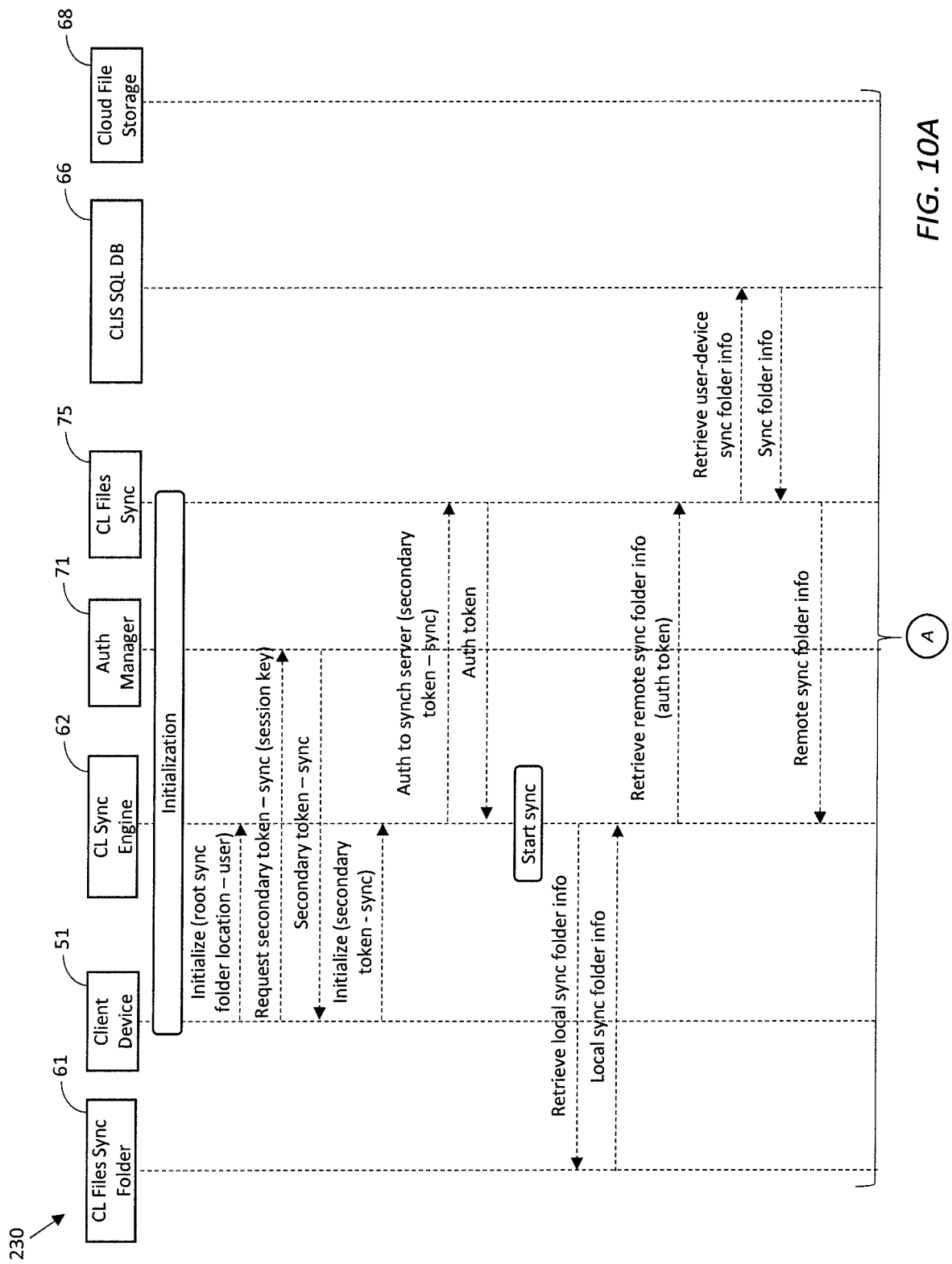
FIGS. 10A and 10B are first and second portions of a sequence flow diagram illustrating connection lease synchronization operations that may be performed within the system of FIG. 9 in accordance with an example embodiment.
Figure 10B:
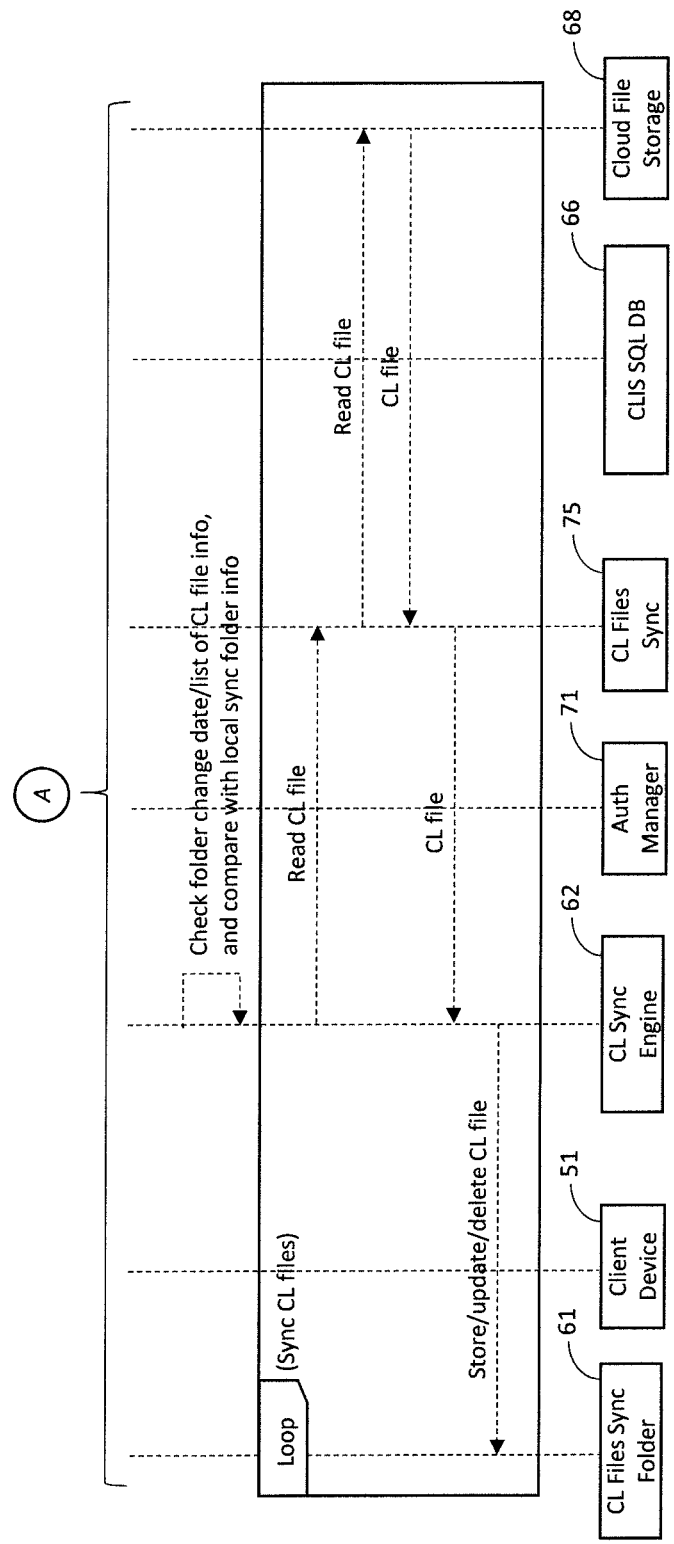

The foregoing will be further understood with reference to an example implementation now described with reference to FIGS. 9-10B. This example implementation shown in the system 90 of FIG. 9 and sequence diagram 230 of FIGS. 10A-10B is implemented using the Citrix Workspace and Citrix Cloud platforms and shares several of the same components utilized in the system 50 discussed above. Here again, it should be noted that this is but one example platform in which the template-based connection lease operations may be utilized, and that these techniques may be incorporated in other suitable virtualization platforms as well.

In the illustrated example, the connection lease issuing appliance 52 is once again implemented using the Connection lease Issuing Service (CLIS) of Citrix Workspace. The CLIS 52 orchestrates connection lease creation by calling into resource providers 91 via the connection lease template appliance 58, which in this example is provided by the connection lease service described above. The transfer of connection leases in the pipeline between the resource providers 91 and CLIS 52 may be via the connection lease services REST APIs 74, for example.

The connection lease service 58 creates initial connection lease templates 92 and intermediate connection lease templates 93 in the shared memory, which in this example is the above-noted cloud file storage 68. Furthermore, the CLIS 52 subsequently accesses the initial connection lease templates 92 and/or the intermediate connection lease templates in the cloud file storage 68 and generates or provisions intermediate connection leases 94 and final connection leases 95.

The templates 92, 93 and connection leases 94, 95 may conceptually be considered as a "factory" assembly line for lease generation, in which the initial templates 92 are at the beginning of the assembly line, and the final connection leases are the completed leases at the end of the assembly line (that is, the final connection lease that may be used to connect a given client device 51 with a respective virtual computing session 73, as shown in FIG. 5). As will be discussed further below, an advantage of this approach is that it provides connection leases at various stages of implementation so that new leases may be created or old leases updated more easily and quickly than having to re-create each lease from scratch.

More particularly, the initial connection lease templates 92 may include relatively high-level lease information, such as resource delivery groups (RDGs) and common connection parameters, for example. A delivery group is a collection of machines selected from one or more machine catalogs. The RDGs specify which users can use which virtual machines, plus the applications and/or desktops available to those users. As noted above, common connection parameters may include network transport type, audio/display settings, security settings, drive mapping settings, etc.

The intermediate connection lease templates 93 incorporate the information from a respective initial template, plus additional specialization information. For example, the additional information may include: app group designations; resource entitlements (e.g., apps the user is entitled to, number of desktops the user is allowed to launch, etc.); session sharing restrictions; tagging; and resource location order per user. Other parameters may also be included in the initial and/or intermediate connection lease templates 92, 93 in different embodiments.

The CLIS 52 generates and stores the intermediate connection leases that include all of the information in a respective intermediate connection lease template, plus still further specialization details. For example, intermediate connection leases may further include: user-specific connection leases that may be re-encrypted for different user devices; resource locations gateway connection leases, so that the assigned gateway 60 (see FIG. 6) does not have to be queried by the CLIS 52 every time a connection is initiated. Resource location direct connection leases may be provided to the gateway 60 so that it may encrypt virtual delivery appliance 53 addresses with a key that only the gateway 60 instances understand. This may be implemented as an additional security measure to help prevent the virtual delivery appliance 53 information from being exposed to client devices 51.

The final connection leases 95 include the information of the respective intermediate connection leases 94, in addition to the specific information associated with a given client device 51. More particularly, this device-specific information may include the above-describe PRLC and CLC components encrypted and signed for a specific user-device. Moreover, additional information may also be included to facilitate autonomous sync, supportability, etc.

In the illustrated example, both the connection lease template appliance 58 and the CLIS 52 use the same shared cloud file storage 68. However, in different embodiments the connection lease template appliance 58 and the CLIS 52 may be assigned different partitions within the cloud file storage 68, or use different file storage altogether. That is, reference to a "shared" memory herein means that the connection lease template appliance 58 stores the templates 92 and/or 93 in a location that is accessible to (or shared with) the CLIS 52 so that it may access the templates, but the CLIS does not necessarily need write access to the template storage area nor have to save its connection leases 94 and/or 95 there. In any event, use of the templates 92, 93 and the intermediate connection leases 94 advantageously helps to reduce cloud load and storage, and the allocation of the particular cloud file storage 68 used for the connection lease template appliance 58 and the CLIS 52 may be selected as appropriate in different implementations to help further these goals.

In some embodiments, the use of the cloud file storage 68 may be abstracted, if desired. For example, a bridge design pattern may be implemented over Azure, AWS or Citrix ShareFile in a shared library that abstracts the file storage. More particularly, the shared API may be used by the different services at the programming level without an entirely new shared service, or a shared cloud file storage service with a REST API may be used, for example.

As noted above, the separate services (the connection lease template appliance 58 and the CLIS 52) use separate databases 67, 66. In some configurations, the databases 67, 66 may also share an abstract API. Connection lease indexes help find a connection lease by GUID, or by user-device information, or through the use of database foreign keys, etc. Then a pointer is found to where a connection lease is stored in the cloud file storage 68. In one example implementation, Citrix ShareFile, which has a persistent user DB, may be used to implement the database 66 and/or 67. By way of example, REDIS+SQL DB may be used based upon their performance, resiliency and persistence capabilities, although other platforms may be used in different embodiments.

Updates in configuration, entitlements, machine state, session state, connection lease expiry, revocation, etc., may be propagated from different stages in the "factory" chain of resource providers 91 to the CLIS 52 to advantageously result in partial or complete connection lease updates. That is, events may be sent from the resource providers 91 to the to the CLIS 52, which is done via the connection lease template appliance 58 in the present example.

The broker 57 (see FIG. 5) may propagate connection lease updates to the connection lease template appliance 58 and/or CLIS 52 in a "factory" pattern as well. For example, such updates may include: machine catalogue, delivery group, app group, or other changes; apps addition/removal; user entitlement updates; virtual deliver appliance 53 power management updates: virtual delivery appliance down/up status (e.g., online or offline); pooled virtual delivery appliance power management; virtual delivery appliance load changes; user session location (e.g., pooled virtual delivery appliances, etc.); and Workspace roaming, e.g., to allow currently running apps that the user might have launched from a first client device 51 to be migrated to another one of the user's client devices.

The CLIS 52 may also check for connection lease expiration and renew connection leases, e.g. based upon recent user activity (an active user), a recent device call home, recent logon, etc. In this regard, the CLIS 52 in some embodiments may renew some or all of the final connection leases 95 associated with a given user based upon one of the user's client devices 51 having been recently used. For example, a user may not have used her laptop for an extended period, but her desktop device has been used regularly within that period. As such, the CLIS 52 knows the user is still active and may therefore be configured to renew the lease for the laptop based upon the use of the desktop device demonstrating the user is still active.

In one example implementation, the CLIS 52 may check expiration/renew leases periodically, e.g., every 7 days (although other time periods may also be used). In another example embodiment, the CLIS 52 may tie the connection lease renewal to a cadence of call home, e.g., it may stop generating new connection leases per user-device if no call home has happened in a certain amount of time (e.g., one month to account for a long vacation time, etc.). The CLIS 52 may keep a timestamp per user-device for this purpose.

Various approaches may also be used for connection lease revocation. In one example approach, no connection lease revocation is performed per user, but bulk revocation may be supported in case a cloud implementation gets hacked, etc. In other implementation, individual connection lease revocation may be enabled. For example, the CLIS 52 may send to the virtual delivery appliance 53 and gateway 60 a GUID to be revoked, similar to patterns of certificate revocation lists. In another example approach, the intermediate and/or final connection leases 94, 95 may be removed from the cloud file storage, and the CL sync engine 62 may accordingly remove them from the client device 51 as well.

Referring additionally to the sequence diagram 230 of FIGS. 10A-10B, in some implementations the CWA sync engine 62 may autonomously sync connection leases from the user's virtual folder 63 into the connection lease files synchronization folder 61 at the client device 51. The process beings with the client 51 requesting synchronization to the root synch folder location for the user's virtual folder 63 (and sub-folder 64) from the connection lease sync engine 62. The client device 51 further requests a secondary token synch based upon a session key from the authentication manager 71, which is returned to the client by the auth manager. The client device 51 then initializes with the connection lease sync engine 62 based upon the synched secondary token, and the connection lease sync engine sends an auth to the connection lease files synch server 75, which return an auth token accordingly. This allows the connection lease sync engine 62 to start the synchronization process.

More particularly, the connection lease sync engine 62 retrieves the local sync folder from the connection lease files synchronization folder 61, and then issues a request to the connection lease files sync server 75 based upon the auth token. The connection lease files sync server 75 then retrieves the user-device synch folder info from the CLIS SQL database 66 and returns it to the connection lease sync engine 62. The connection lease sync engine 62 then checks the folder change/date list of connection lease file info, and compares that with the local synchronization folder 61 info. The connection lease sync engine 62 may then iteratively cooperate with the connection lease files synch server 75 to read the connection lease file info from the cloud file storage 68 and store, update, or delete the appropriate connection lease files at the local synchronization folder 61 of the client device 51.

For an embedded (e.g., CWA) browser implementation, the sync engine 62 may be activated upon store refresh. Alternatively, a background refresh may also be performed, e.g., from a Progressive Web App (PWA) service worker.

The foregoing approaches may advantageously be used to provide efficient composite (modular) connection lease design. Moreover, these approaches also provide a "factory" pattern for connection lease background event-based generation and management using template, intermediate and final user-device CLs. As a result, a hierarchical opportunistic approach is afforded for enhanced resiliency and accurate real-time data on entitlements and connection steering. Other advantages of the approaches set forth herein may include one or more of improved resiliency, scalability, security and user experience of connection technology.

Other advantages of the foregoing approaches may include an autonomous one-way sync of CLs to client devices, as well as mechanisms to: reduce overall size of connection leases on client devices/endpoints and cloud; reduce network traffic; reduce load on cloud, including the broker 57, Workspace 55, CLIS 52, etc.; facilitate telemetry and supportability; keep endpoints (e.g., CWA) relatively simple, while the complexity and incremental improvements occur in the cloud; improve resiliency, security and user experience with connection leases.

Figure 12:
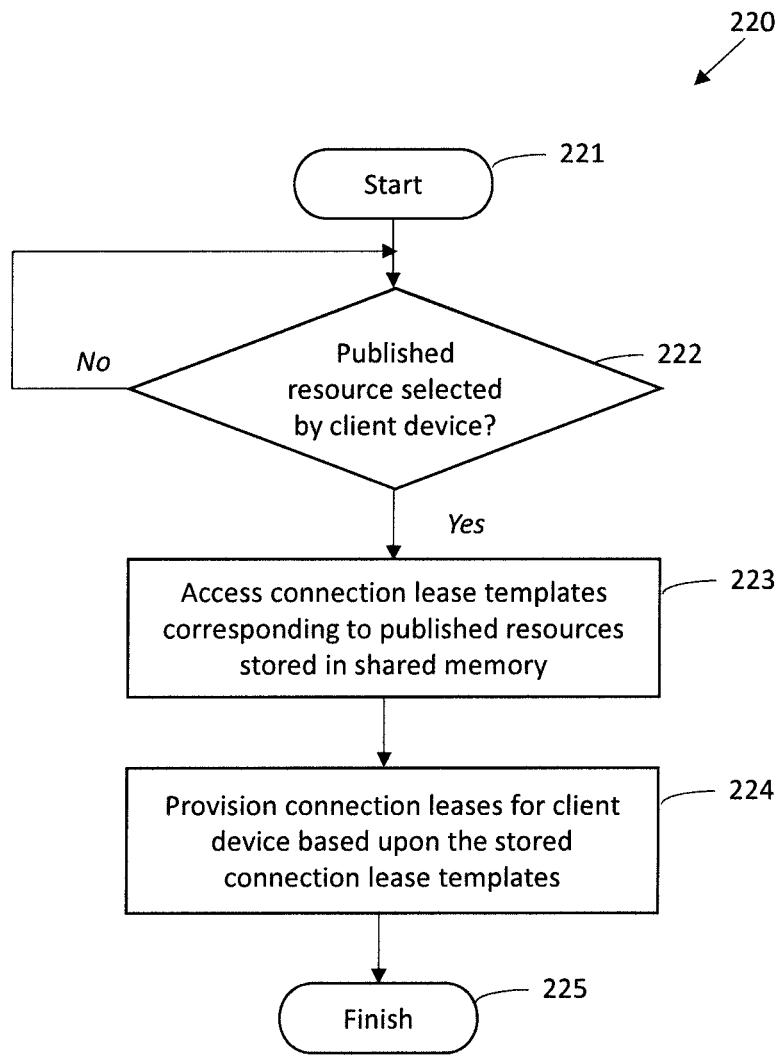
FIG. 12 is a flow diagram illustrating example method aspects associated with the connection lease issuing appliance of the system of FIG. 8

Related method aspects to the system 80 of FIG. 8 are now described with reference to the flow diagram 220 of FIG. 12. Beginning at Block 221, responsive to selection of a published resource by a client device 81 (Block 222), the method illustratively includes accessing connection lease templates corresponding to published resources 91, which are stored in a shared memory 68, using the connection lease issuing appliance 82, at Block 223. The method further illustratively includes provisioning connection leases for respective client devices 81 using the connection lease issuing appliance 82 based upon the stored connection lease templates, at Block 224, which concludes the illustrated method (Block 225). As noted above, the connection leases may be provisioned on demand responsive to selection of the published resources by the client devices 81, and the connection leases may provide instructions for connecting the client devices to virtual computing sessions 83 corresponding to the published resources.

Further Example Embodiments

The following examples are further example embodiments, from which other permutations and configurations will be apparent to the skilled artisan.

Example A is for computing device comprising: a memory and a processor cooperating with the memory and configured to generate connection leases for published resources selected by client devices. The connection leases provide instructions for connecting the client devices to virtual computing sessions corresponding to the published resources. Each connection lease comprising a published resource lease component unique to the selected published resource, and a common lease component shared by a plurality of different published resources.

Example B includes the subject matter of Example A, wherein the client devices are connected to the virtual computing session by at least one virtual delivery appliance; and wherein the common lease component comprises a network address associated with the at least one virtual delivery appliance.

Example C includes the subject matter of Example A and B, wherein the client devices are connected to the virtual delivery appliance by at least one gateway appliance; and wherein the common lease component comprises a network address associated with the at least one gateway appliance.

Example D includes the subject matter of Example A, wherein at least some of the virtual computing sessions comprise cloud-based virtual computing sessions; wherein the client devices are connected to the cloud-based virtual computing sessions by the at least one cloud interface appliance; and wherein the common lease component comprises a network address associated with the at least one cloud interface appliance.

Example E includes the subject matter of Example A, wherein the client devices are connected to the virtual computing session by a plurality of virtual delivery appliances grouped into different zones; and wherein the common lease component comprises a zone designation for a given group of virtual delivery appliances.

Example F includes the subject matter of Example A, wherein the at least one virtual delivery appliance comprises a plurality of virtual delivery appliances; and wherein the common lease component comprises an ordered list of at least some of the virtual delivery appliances.

Example G includes the subject matter of Example A, wherein the common lease components comprise at least one of network transport type settings, audio settings, display resolution settings, security settings, and drive mapping enablement settings.

Example H includes the subject matter of Example A, wherein the processor is further configured to update the published resource lease component and the common lease component independent from one another.

Example I includes the subject matter of Example A, the published resource lease component comprises at least one of a resource key global unique identifier (GUID), a user identifier, and an expiration time.

Example J is directed to a method comprising generating connection leases at a server for published resources selected by client devices, the connection leases providing instructions for connecting the client devices to virtual computing sessions corresponding to the published resources. Each connection lease comprises a published resource lease component unique to the selected published resource, and a common lease component shared by a plurality of different published resources.

Example K includes the subject matter of Example J, wherein the client devices are connected to the virtual computing session by at least one virtual delivery appliance; and wherein the common lease component comprises a network address associated with the at least one virtual delivery appliance.

Example L includes the subject matter of Example J and K, wherein the client devices are connected to the virtual delivery appliance by at least one gateway appliance; and wherein the common lease component comprises a network address associated with the at least one gateway appliance.

Example M includes the subject matter of Example J, wherein at least some of the virtual computing sessions comprise cloud-based virtual computing sessions; wherein the client devices are connected to the cloud-based virtual computing sessions by the at least one cloud interface appliance; and wherein the common lease component comprises a network address associated with the at least one cloud interface appliance.

Example N includes the subject matter of Example J, wherein the client devices are connected to the virtual computing session by a plurality of virtual delivery appliances grouped into different zones; and wherein the common lease component comprises zone designations for the different groups of virtual delivery appliances.

Example O is directed to a computing system comprising: a plurality of client devices configured to select published resources corresponding to virtual computing sessions; a server configured to generate connection leases for published resources selected by the client devices, each connection lease comprising a published resource lease component unique to the selected published resource and a common lease component shared by a plurality of different published resources; and at least one virtual delivery appliance configured to connect the client devices to respective virtual computing sessions based upon the connection leases.

Example P includes the subject matter of Example O, wherein the common lease component comprises a network address associated with the at least one virtual delivery appliance.

Example Q includes the subject matter of Example O, further comprising at least one gateway appliance configured to connect the client devices to the at least one virtual delivery appliance; and wherein the common lease component comprises a network address associated with the at least one gateway appliance.

Example R includes the subject matter of Example O, wherein at least some of the virtual computing sessions comprise cloud-based virtual computing sessions; further comprising at least one cloud interface appliance configured to connect the client devices to the cloud-based virtual computing sessions; and wherein the common lease component comprises a network address associated with the at least one cloud interface appliance.

Example S includes the subject matter of Example O, wherein the common lease component comprises virtual computing session locations; and wherein the server updates the common lease components responsive to changes in the virtual computing session locations.

Example T includes the subject matter of Example O, wherein the common lease component further comprises status indicators for active and disconnected sessions; and wherein the at least one virtual delivery appliance is further configured to re-connect the client devices to previously established active and disconnected sessions.

Example AA is directed to a computing device comprising: a memory and a processor cooperating with the memory and configured to access a plurality of connection lease templates corresponding to published resources stored in a shared memory; and provision connection leases for respective client devices using a connection lease issuing appliance based upon the stored connection lease templates. The connection leases are provisioned on demand responsive to selection of the published resources by the client devices, and the connection leases provide instructions for connecting the client devices to virtual computing sessions corresponding to the published resources.

Example BB includes the subject matter of Example AA, wherein the templates comprise initial templates including a first connection parameter, and intermediate templates including the first parameter and a second connection parameter.

Example CC includes the subject matter of Example AA and BB, wherein the first connection parameter comprises at least one of a published resource delivery group and a common connection parameter.

Example DD includes the subject matter of Example AA and BB, wherein the second connection parameter comprises at least one of an application group, a resource entitlement, a session sharing restriction, a tagging parameter, and a resource location order.

Example EE includes the subject matter of Example AA, wherein the processor is further configured to generate and store in the shared memory intermediate connection leases based upon the connection lease templates and each intermediate connection lease being associated with a respective user; and wherein the processor is configured to provision the intermediate connection leases into final connection leases for respective client devices associated with each user.

Example FF includes the subject matter of Example AA and EE, wherein the processor is further configured to renew all of the final connection leases associated with a given user before the end of an expiration period based upon usage of at least one of the final connection leases associated with the given user during the expiration period.

Example GG is directed to a method comprising: accessing a plurality of connection lease templates corresponding to published resources stored in a shared memory using a connection lease issuing appliance; and provisioning connection leases for respective client devices using the connection lease issuing appliance based upon the stored connection lease templates. The connection leases are provisioned on demand responsive to selection of the published resources by the client devices, and the connection leases provide instructions for connecting the client devices to virtual computing sessions corresponding to the published resources.

Example HH includes the subject matter of Example GG, wherein the templates comprise initial templates including a first connection parameter, and intermediate templates including the first parameter and a second connection parameter.

Example II includes the subject matter of Example GG and HH, wherein the first connection parameter comprises at least one of a published resource delivery group and a common connection parameter.

Example JJ includes the subject matter of Example GG and HH, wherein the second connection parameter comprises at least one of an application group, a resource entitlement, a session sharing restriction, a tagging parameter, and a resource location order.

Example KK includes the subject matter of Example GG, further comprising generating and storing in the shared memory intermediate connection leases based upon the connection lease templates using the connection lease issuing appliance, with each intermediate connection lease being associated with a respective user; and wherein provisioning comprises provisioning the intermediate connection leases into final connection leases for respective client devices associated with each user.

Example LL includes the subject matter of Example GG and KK, further comprising renewing all of the final connection leases associated with a given user before the end of an expiration period based upon usage of at least one of the final connection leases associated with the given user during the expiration period using the connection lease issuing appliance.

Example MM is directed to a computing system comprising: a plurality of client devices configured to select published resources corresponding to virtual computing sessions; a connection lease template appliance configured to generate a plurality of connection lease templates corresponding to the published resources and store the connection lease templates in a shared memory; a connection lease issuing appliance configured to access the connection lease templates stored in the shared memory and provision connection leases for respective client computing devices based upon the connection lease templates, the connection leases being provisioned on demand responsive to selection of the published resources by the client devices; and at least one virtual delivery appliance configured to connect the client devices to respective virtual computing sessions based upon the connection leases.

Example NN includes the subject matter of Example MM, wherein the templates comprise initial templates including a first connection parameter, and intermediate templates including the first parameter and a second connection parameter.

Example OO includes the subject matter of Example MM and NN, wherein the first connection parameter comprises at least one of a published resource delivery group and a common connection parameter.

Example PP includes the subject matter of Example MM and NN, wherein the second connection parameter comprises at least one of an application group, a resource entitlement, a session sharing restriction, a tagging parameter, and a resource location order.

Example QQ includes the subject matter of Example MM, wherein the connection lease issuing appliance is further configured to generate and store intermediate connection leases in the shared memory based upon the connection lease templates each associated with a respective user, and provision the intermediate connection leases into final connection leases for respective client computing devices associated with each user.

Example RR includes the subject matter of Example MM and QQ, wherein the connection lease issuing appliance is further configured to renew all of the final connection leases associated with a given user before the end of an expiration period based upon usage of at least one of the final connection leases associated with the given user during the expiration period.

Example SS includes the subject matter of Example MM, wherein the at least one virtual delivery agent comprises a plurality of virtual delivery agents; and wherein the connection lease issuing appliance is further configured to provision new connection leases for the client computing devices based upon changes to the virtual delivery agents.

Example TT includes the subject matter of Example MM, wherein the connection lease issuing appliance is further configured to provision new connection leases for the client computing devices based upon changes to entitlements to the published resources.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
  a memory and a processor cooperating with the memory and configured to
    access a plurality of connection lease templates corresponding to published resources stored in a shared memory and including shared connection parameters for a group of client devices,
    store intermediate connection leases in the shared memory based upon the connection lease templates, the intermediate connection leases provisioned for different users,
    provision subsequent connection leases in the shared memory from the intermediate connection leases responsive to requests for the published resources by the client devices, the subsequent connection leases provisioned for client devices within the group and associated users, the subsequent connection leases providing instructions for connecting the client devices to virtual computing sessions corresponding to the published resources.

2. The computing device of claim 1 wherein the connection lease templates comprise initial templates including a first connection parameter, and intermediate templates including the first parameter and a second connection parameter.

3. The computing device of claim 2 wherein the first connection parameter comprises a published resource delivery group.

4. The computing device of claim 2 wherein the second connection parameter comprises at least one of an application group, a resource entitlement, a session sharing restriction, a tagging parameter, and a resource location order.

5. The computing device of claim 1 wherein the processor is further configured to renew all of the subsequent connection leases associated with a given user before the end of an expiration period based upon usage of at least one of the subsequent connection leases associated with the given user during the expiration period.

6. A method comprising:
  accessing a plurality of connection lease templates corresponding to published resources stored in a shared memory and including shared connection parameters for a group of client devices using a connection lease issuing appliance;
  storing intermediate connection leases in the shared memory based upon the connection lease templates, the intermediate connection leases provisioned for different users;
  provisioning subsequent connection leases in the shared memory from the intermediate connection leases responsive to requests for the published resources by the client devices, the subsequent connection leases provisioned for client devices within the group and associated users, and the subsequent connection leases providing instructions for connecting the client devices to virtual computing sessions corresponding to the published resources.

7. The method of claim 6 wherein the connection lease templates comprise initial templates including a first connection parameter, and intermediate templates including the first parameter and a second connection parameter.

8. The method of claim 7 wherein the first connection parameter comprises a published resource delivery group.

9. The method of claim 7 wherein the second connection parameter comprises at least one of an application group, a resource entitlement, a session sharing restriction, a tagging parameter, and a resource location order.

10. The method of claim 6 further comprising renewing all of the subsequent connection leases associated with a given user before the end of an expiration period based upon usage of at least one of the subsequent connection leases associated with the given user during the expiration period using the connection lease issuing appliance.

11. A computing system comprising:
- a connection lease template appliance comprising a processor and associated memory and configured to generate a plurality of connection lease templates corresponding to the published resources and including shared connection parameters for a group of client devices configured to select published resources corresponding to virtual computing sessions, and store the connection lease templates in a shared memory;
- a connection lease issuing appliance comprising a processor and associated memory and configured to
  - access the connection lease templates stored in the shared memory,
  - store intermediate connection leases in the shared memory based upon the connection lease templates, the intermediate connection leases provisioned for different users, and
  - provision subsequent connection leases in the shared memory from the intermediate connection leases responsive to requests for the published resources by the client devices, the subsequent connection leases provisioned for client computing devices within the group and associated users; and
- at least one virtual delivery appliance comprising a processor and associated memory and configured to connect the client devices to respective virtual computing sessions based upon the connection leases.

12. The computing system of claim 11 wherein the connection lease templates comprise initial templates including a first connection parameter, and intermediate templates including the first parameter and a second connection parameter.

13. The computing system of claim 12 wherein the first connection parameter comprises a published resource delivery.

14. The computing system of claim 12 wherein the second connection parameter comprises at least one of an application group, a resource entitlement, a session sharing restriction, a tagging parameter, and a resource location order.

15. The computing system of claim 11 wherein the connection lease issuing appliance is further configured to renew all of the subsequent connection leases associated with a given user before the end of an expiration period based upon usage of at least one of the subsequent connection leases associated with the given user during the expiration period.

16. The computing system of claim 11 wherein the at least one virtual delivery agent comprises a plurality of virtual delivery agents; and wherein the connection lease issuing appliance is further configured to provision new connection leases for the client computing devices based upon changes to the virtual delivery agents.

17. The computing system of claim 11 wherein the connection lease issuing appliance is further configured to provision new connection leases for the client computing devices based upon changes to entitlements to the published resources.

* * * * *